United States Patent
Kitabayashi

(10) Patent No.: US 7,216,988 B2
(45) Date of Patent: May 15, 2007

(54) OPTICAL DEVICE AND PROJECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 11/089,372

(22) Filed: Mar. 25, 2005

(65) Prior Publication Data

US 2005/0220156 A1 Oct. 6, 2005

(30) Foreign Application Priority Data

Mar. 30, 2004 (JP) ............... 2004-100487

(51) Int. Cl.
- *G03B 21/18* (2006.01)
- *G03B 21/26* (2006.01)
- *G03B 21/16* (2006.01)

(52) U.S. Cl. .......................... 353/54; 353/61
(58) Field of Classification Search .......... 353/54, 353/61; 359/358
See application file for complete search history.

(56) References Cited

U.S. PATENT DOCUMENTS 7,085,034 B2 * 8/2006 Fujimori et al. ............ 359/288

FOREIGN PATENT DOCUMENTS

| JP | A-01-159684 | 6/1989 |
|----|-------------|--------|
| JP | A-2003-124670 | 4/2003 |

* cited by examiner

*Primary Examiner*—Melissa Jan Koval
(74) *Attorney, Agent, or Firm*—Oliff & Berridge, PLC

(57) ABSTRACT

An optical device capable of efficiently cooling a light modulation element and preventing deterioration in an image formed on the optical modulation element having a light modulation device. The light modulation device includes a light modulation element to modulate a luminous flux and to form an optical image; and a support frame to hold the light modulation element, the support frame having an aperture for an image-forming region of the light modulation element. The light modulation device, is formed with an aperture, and provided with a container-like coolant enclosure sealed with a coolant for cooling the light modulation element. The coolant enclosure has a first cooling chamber hermetically sealed with the coolant in a space including the aperture, and a second cooling chamber formed in a position avoiding the aperture and partitioned from the first cooling chamber to thereby allow another coolant from an exterior chamber to flow therein.

14 Claims, 16 Drawing Sheets

F I G. 7
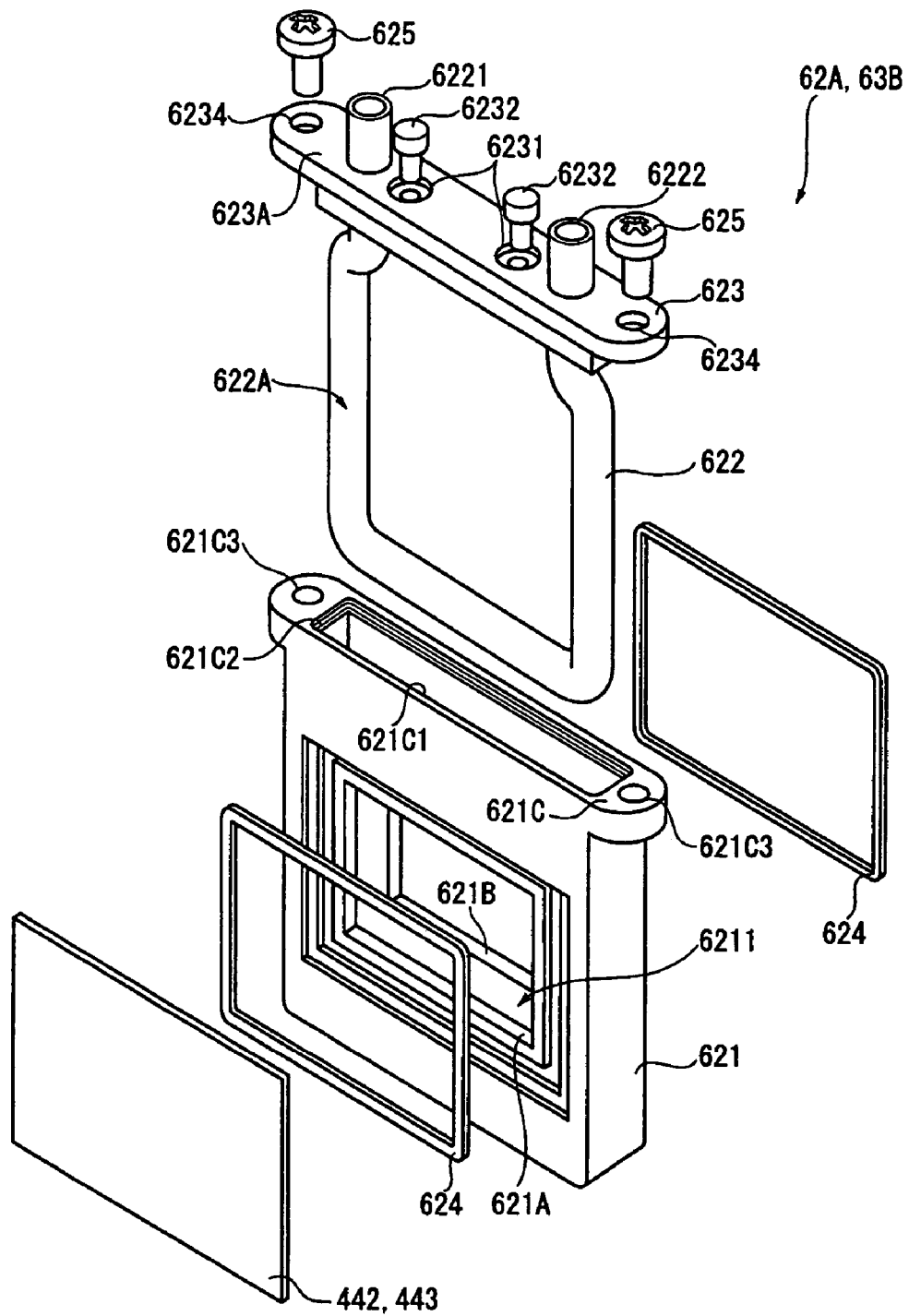

F I G. 1 2
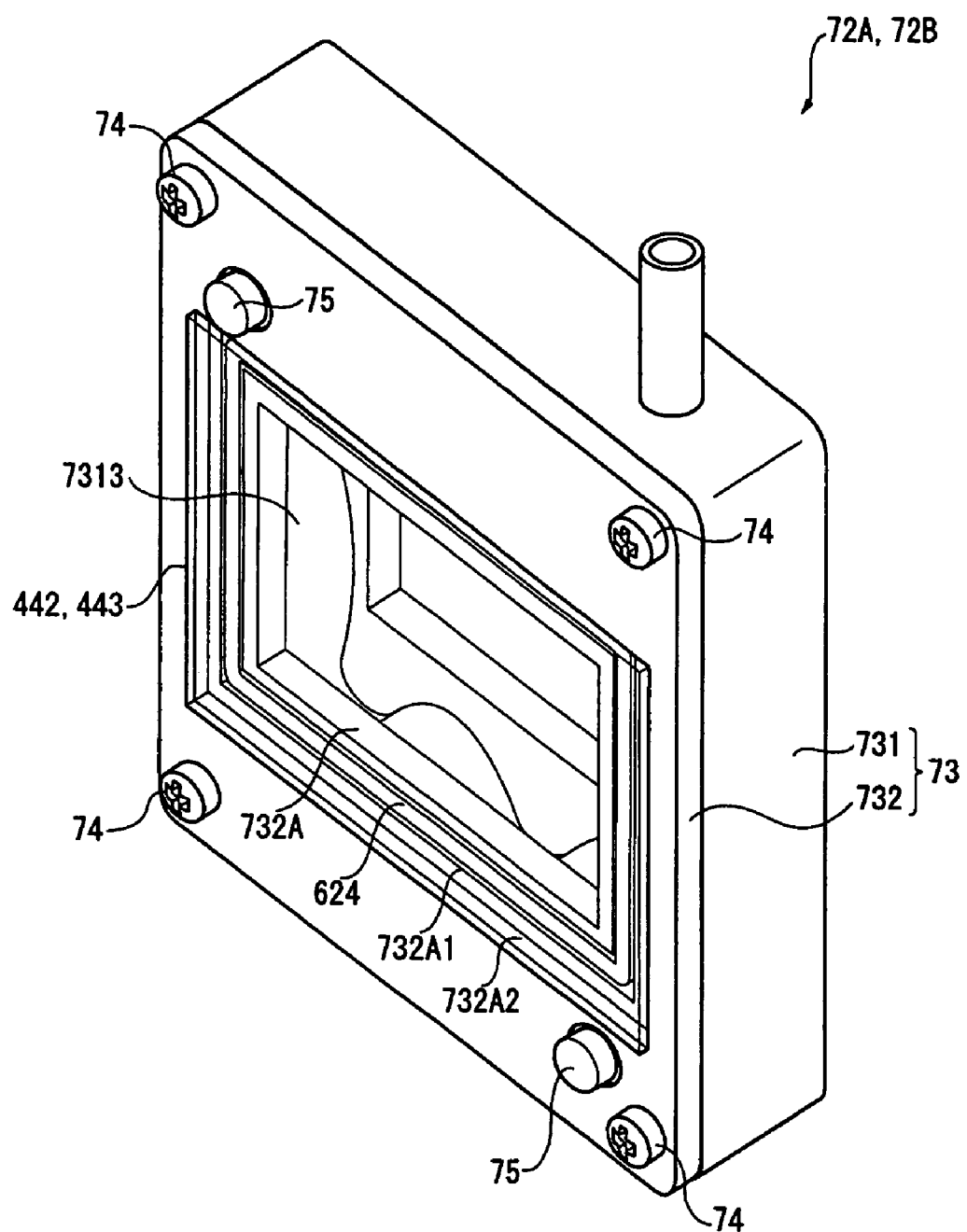

F I G. 16
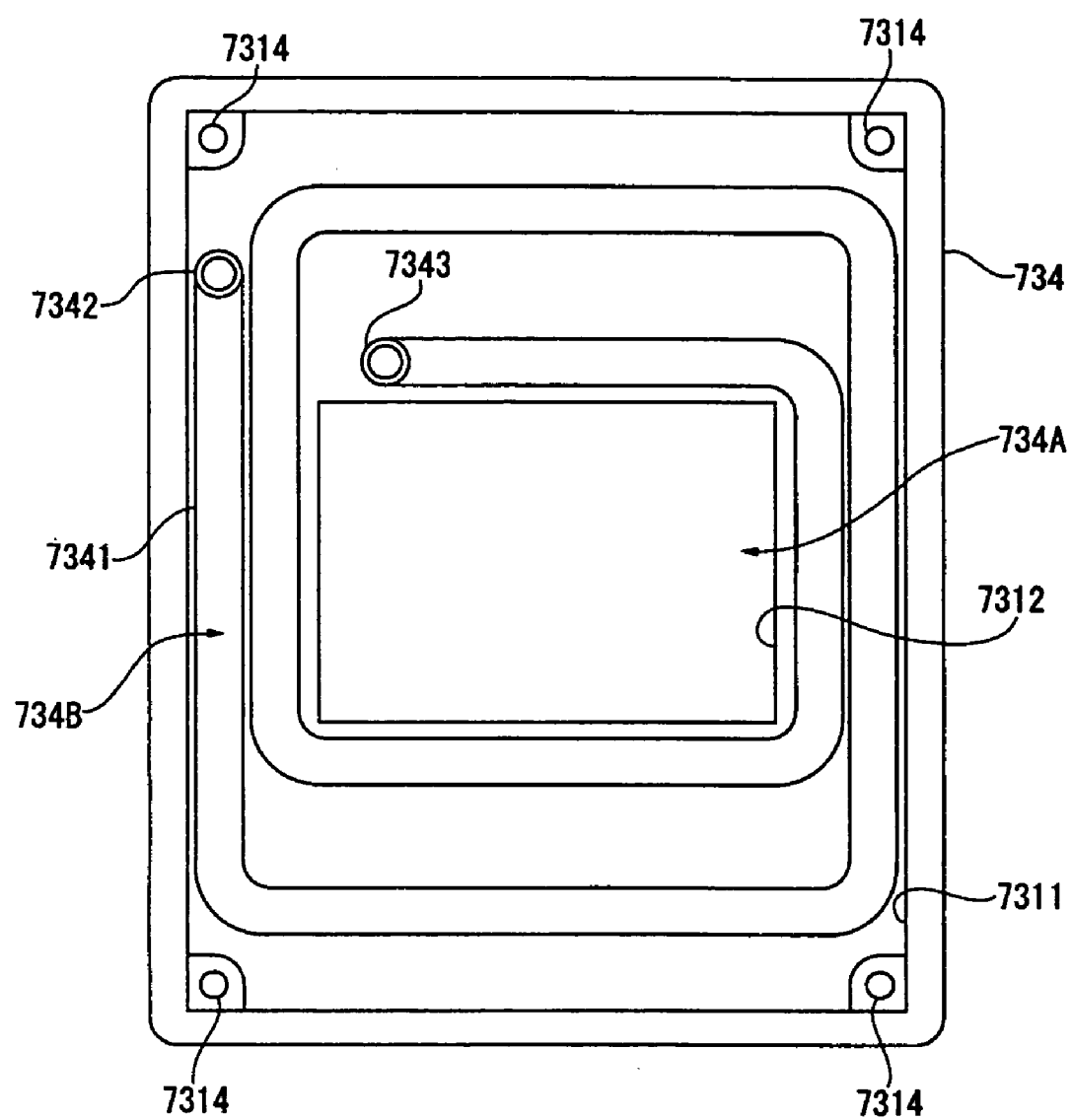

OPTICAL DEVICE AND PROJECTOR

BACKGROUND

The exemplary embodiments relate to an optical device having an optical modulation element to modulate the luminous flux emitted from the light source according to image information and to form an optical image and a cooling device for cooling the optical modulation element, and to a projector having the optical device.

Projectors of the related art are used in the presentations at conferences, academy meetings, exhibitions, etc. or in viewing movies in households, or the like. Such a projector has an optical device having a light source, an optical modulation element to modulate the luminous flux emitted from the light source according to image information and to form an optical image, and a plurality of optical components arranged in the front and rear stages of the optical modulation element and to optically convert the incident luminous flux. The optical image formed by the optical device is projected with magnification.

Due to the recent brightness increase and size reduction in the projector, temperature rise is conspicuous on the optical modulation element and optical components arranged within the projector. Meanwhile, these optical modulation element and optical components are not resistive to heat, to readily cause thermal deteriorations. Where a thermal deterioration occurs in the optical modulation element and optical components, a bad effect upon optical image formation is encountered and may possibly raise trouble in maintaining projector functions. For this reason, in the related art a general practice is to employ a cooling system of an air-cooled type to feed a cooling air by way of a fan or the like. However, the air-cooled type is limited in heat radiation capability. Furthermore, in order to secure air feed amount, there is a need to rotate the fan at a high speed and to use a large-sized fan, thus raising a problem of making it impossible or difficult to cope with noise and size reductions for the projector. Consequently, studies have been made on other cooling systems for efficiently cooling the light modulation element and optical components.

In the related art, there is an electronic device having a cooling structure for circulating a coolant (coolant liquid) through the interior thereof and cooling a heat generating element, as a cooling system for solving such a problem (see JP-A-2003-124670, for example). In such a cooling structure, a water-cooled jacket is attached to the CPU as a heat generating element, to connect the water-cooled jacket, the heat-releasing pipe and the pump together by way of a tube. The CPU is cooled by circulating the coolant filled inside by the pump. In case such a cooling structure is employed in the projector optical device to thereby cool the heat of the light modulation element, the light modulation element can be cooled efficiently because the liquid is greater in specific heat and higher in heat transmission power as compared to air. Because of the absence of fan rotation sound and blade noise, noise reduction for the projector can be realized.

SUMMARY

In order to effectively cool the optical modulation element by adopting the projector having a cooling structure as described in JP-A-2003-124670, there is a necessity to cool the light modulation element at its optical image-forming region by use of a coolant. In such a case, the luminous flux is transmitted through the coolant to form an optical image on the light modulation element. Here, where the coolant circulates in the cooling structure for a long time, impurities mix in the coolant from the circulation path, and/or thermal deterioration occurs in the coolant due to the heat of the light modulation device, possibly causing a color change in the coolant. In such a case, there is a problem in that a deterioration in the optical image formed on the optical modulation element is encountered because of transmission of a luminous flux though the coolant changed in color.

The exemplary embodiments provide an optical device capable of efficiently cooling the light modulation element and preventing deterioration in the image formed on the optical modulation element.

An optical device of the exemplary embodiments has a light modulation device, the optical device including a light source emitting a luminous flux; a light modulation element to modulate the luminous flux emitted from the light source according to image information and to form an optical image; a support frame having an aperture suited for an image-forming region of the light modulation element, the support frame holding the light modulation element; a coolant to cool the light modulation element; the light modulation device, being formed with an aperture suited for the image-forming region of the light modulation device at at least one of a luminous-flux incident side and luminous-flux exiting side of the light modulation device, the light modulation device having a container-like coolant enclosure sealed with the coolant; and a coolant enclosure having a first cooling chamber hermetically sealed with the coolant in a space including the aperture, and having a second cooling chamber formed in a position avoiding the aperture and partitioned from the first cooling chamber to allow another coolant to flow therein, the another coolant introduced from an exterior of the coolant enclosure.

According to the exemplary embodiments, the optical modulation element is cooled by a coolant hermetically sealed in the first cooling chamber of the coolant enclosure so that the coolant can be cooled by another coolant flowing in the second cooling chamber. Here, the luminous flux incident on the light modulation element or the luminous flux exited the optical modulation element is transmitted through the cooling medium of the first cooling chamber. Consequently, deterioration of the coolant in the first cooling chamber is suppressed due to mixing of impurities in the coolant because of cooling the optical modulation element without circulation. Also, because the coolant is cooled by the coolant circulating in the second cooling chamber, the temperature of the coolant for cooling the optical modulation element can be suppressed. This can not only improve the efficiency of cooling the optical modulation element by the coolant of the first cooling chamber but also may prevent the coolant from thermally deteriorating. Accordingly, in addition to the capability of efficiently cooling the optical modulation element, the coolant through which a luminous flux is to transmit can be suppressed from deteriorating, hence preventing the deterioration in an optical image formed by the optical modulation element.

Meanwhile, because the coolant flowing in the second cooling chamber is free from transmission of a luminous flux, the coolant in the second cooling chamber is not transmissive to the luminous flux and is not colorlessly transparent. Therefore, because the range can be broadened for coolant selection, an inexpensive coolant can be employed thus eventually reducing the manufacturing cost for the optical device.

According to the exemplary embodiments, a tubular member structured of a heat-conductive material is preferably arranged in the first cooling chamber, the second cooling chamber being provided as an interior space of the tubular member.

This exemplary embodiment can positively define the first cooling chamber and the second cooling chamber, the cooling device being simplified in structure. Namely, the coolant enclosure can be structured by arranging a heat-conductive tubular member for a second cooling chamber in the first cooling chamber in a manner surrounding the aperture through which a luminous flux is to transmit so that a second coolant is allowed to flow in the tubular member.

Because the second cooling chamber is structured as a space at an interior of the tubular member, the coolant has improved flowability in the second cooling chamber. This can prevent the coolant from staying in the second cooling chamber, thus enabling to efficiently cool the coolant of the first cooling chamber by way of the coolant of the second cooling chamber. Therefore, the coolant of the first cooling chamber can be effectively cooled to eventually cool the optical modulation element effectively.

In the exemplary embodiments, the tubular member is preferably arranged in a manner surrounding the aperture.

The exemplary embodiments may increase the contact area between the coolant of the first cooling chamber and the tubular member. Accordingly, the heat of the coolant of the first cooling chamber is allowed to conduct to the tubular member, and the heat of the tubular member can be easily cooled by the coolant flowing in the tubular member. Therefore, the coolant of the first cooling chamber can be cooled effectively to cool the optical modulation element with further efficiency.

According to the exemplary embodiments, the coolant enclosure is preferably structured of a heat-conductive material, the coolant enclosure is formed with a partition wall surrounding the aperture, the first cooling chamber being defined at an inner of the partition wall and the second cooling chamber being defined at an outer thereof.

The exemplary embodiments define the first and second cooling chambers by the partition wall surrounding the aperture through which a luminous flux is transmitted. The partition wall is formed of a heat-conductive material. Accordingly, these can be formed integrally within the coolant enclosure. This can reduce the number of components for the coolant enclosure, thus simplifying the structure of the coolant enclosure. Because the first and second cooling chambers are formed integrally in the coolant enclosure, there is no need to provide any of the first and second cooling chambers as separate members within the coolant enclosure. Consequently, the manufacturing process for the coolant enclosure can be simplified.

According to the exemplary embodiments, a winding is preferably formed protruding toward inward and outward of the partition wall, in at least a part of the partition wall.

The exemplary embodiments can increase the contact area between the partition wall and any of the coolant of the first cooling chamber and the coolant of the second cooling chamber by the winding formed in the partition wall. This allows for an effective heat conduction between the coolant of the first cooling chamber and the coolant of the second cooling chamber through the partition wall. Therefore, the coolant of the first cooling chamber can be cooled efficiently to eventually improve the efficiency of cooling the optical modulation element even further.

According to the exemplary embodiments, the support frame is preferably formed with a projection protruding outward of the coolant enclosure, a fixture being provided outer of and covering the coolant enclosure and fixing the coolant enclosure on the support frame by an engagement with the projection.

This can easily fix the coolant enclosure on the support frame by attaching the fixer in a manner to engage with the projection formed on the support frame after attaching the coolant enclosure on the support frame at its luminous-flux incident side or luminous-flux exiting side. Therefore, the manufacturing process for the optical device can be simplified.

According to the exemplary embodiments, the coolant enclosure is preferably provided at both luminous-flux exiting side and luminous-flux incident side of the optical modulation device, to provide a flow-passage connection member communicating between the second cooling chambers of the respective coolant enclosure.

According to the exemplary embodiments, respective cooling devices can cool the optical modulation element at both a surface of luminous flux incidence and exit. This can cool the optical modulation element effectively. Meanwhile, because the optical modulation element can be cooled at both surfaces of the optical modulation element, heat distribution can be made uniform on the optical modulation element. Therefore, the optical modulation element can be prevented from locally increasing in temperature, making it possible to suppress thermal deterioration further and extend product life.

Furthermore, because the second cooling chambers provided in the respective coolant enclosures are connected together by the flow-passage connection member, the passage route can be unified for the coolants flowing the second cooling chambers, the optical device can be simplified in structure.

Meanwhile, a projector of the exemplary embodiments modulates a luminous flux emitted from a light source according to the image information and to form an optical image to thereby project the optical image with magnification, comprising an optical device. The optical device is set forth in the foregoing.

The exemplary embodiments can exhibit the effect nearly the same as the foregoing optical device. Namely, the optical modulation element for forming an optical image can be cooled by the coolant hermetically sealed in the first cooling chamber of the coolant enclosure, and moreover the coolant can be cooled by another coolant flowing in the second cooling chamber. Therefore, the optical modulation element can be cooled effectively.

Meanwhile, the coolant of the second cooling chamber to cool the coolant of the first cooling chamber is free from transmission of a luminous flux for utilization in forming an optical image. Accordingly, even where there is a color change in the coolant flowing in the second cooling chamber and where there is a mixing of impurities in the course of flow, no bad effect upon an optical image formed is encountered.

Therefore, the optical modulation element can be cooled effectively and optical image deterioration can be prevented.

BRIEF DESCRIPTION OF THE DRAWINGS

FIG. 7 illustrates an exploded perspective schematic of a cooling device in an exemplary embodiment;

FIG. 12 illustrates a perspective schematic of a cooling device in an exemplary embodiment as viewed from above;

FIG. 16 illustrates a front view schematic of a modification to a first enclosure member in an exemplary embodiment.

DETAILED DESCRIPTION OF EMBODIMENTS

1. First Exemplary Embodiment

Hereunder, a first embodiment is explained with reference to the drawings.

(1) Projector Construction

Figure 1:
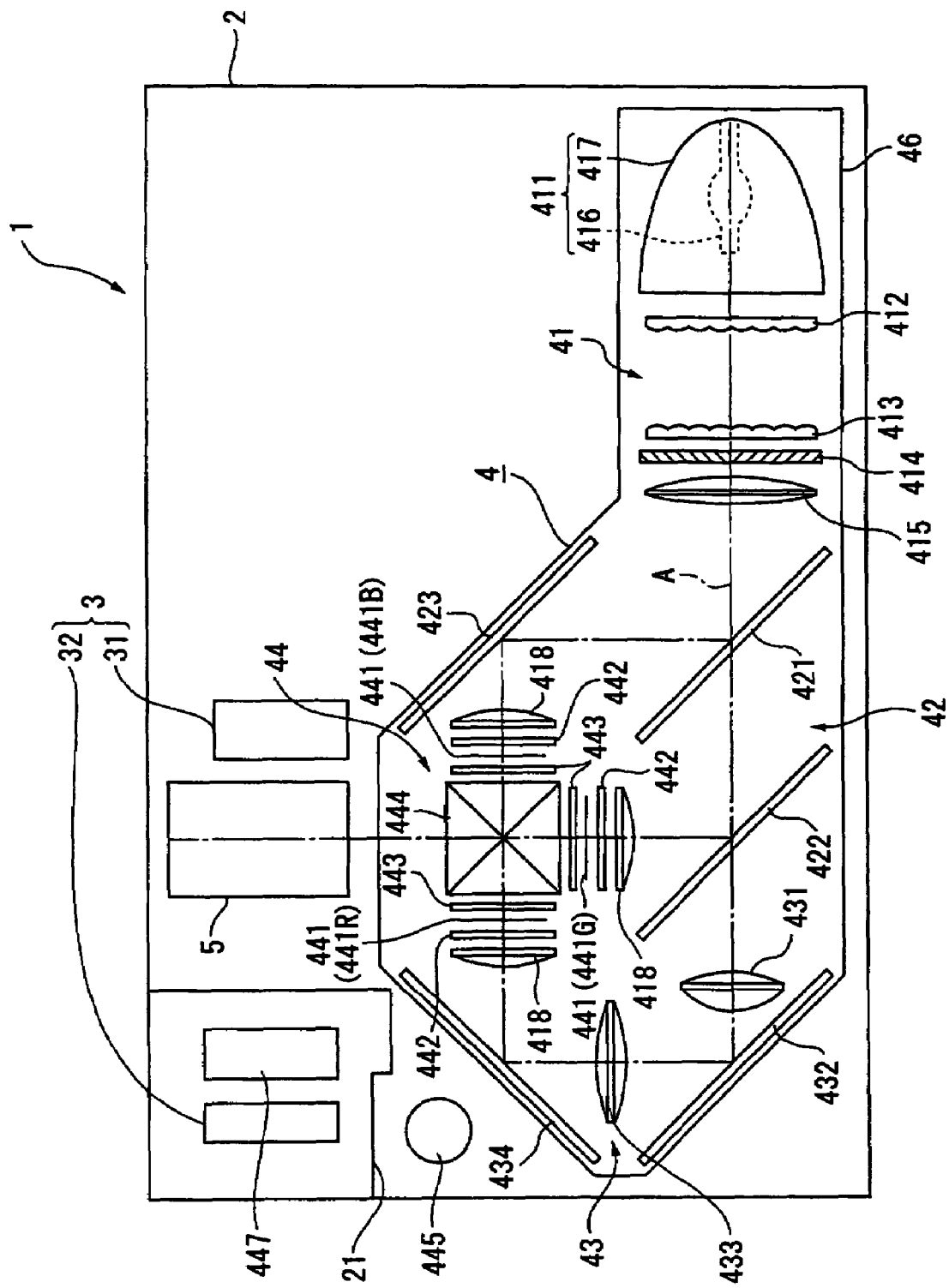
FIG. 1 illustrates a schematic construction of a projector according to a first exemplary embodiment of the present invention.

FIG. 1 is a schematic typically illustrating a construction of a projector 1.

The projector 1 modulates the luminous flux emitted from a light source according to image information and forms an optical image, to thereby project, with magnification, the formed optical image onto a screen. The projector 1 has an exterior case 2, a cooling unit 3, an optical unit 4 and a projection lens 5 as a projection optical device.

Although not shown in FIG. 1, a power-source block, a lamp drive circuit, etc. may also be located inside of the exterior case 2, in addition to the cooling unit 3, the optical unit 4 and the projection lens 5.

The exterior case 2 is structured of a synthetic resin, or the like, and is formed nearly cuboid. Arranged in the exterior case 2 are the cooling unit 3, the optical unit 4 and the projection lens 5. The exterior case 2 is structured by an upper case structuring the top, front, rear and side surfaces of the projector 1 and a lower case structuring the bottom, front, rear and side surfaces of the projector 1, (not shown). The upper and lower cases are fixed together by means of screws, or the like.

The exterior case 2 is not limited to the synthetic-resin, but may be formed of another material, such as, for example, a metal.

Meanwhile, although not shown, the exterior case 2 is formed with an air-intake port for introducing cooling air from the exterior of the projector 1 to the interior by the cooling unit 3 and with an air-discharge port for discharging the air heated in the interior of the projector 1.

Furthermore, in the exterior case 2, as shown in FIG. 1, there is formed a partition wall 21 in a position lateral of the projection lens 5 and in a corner of the exterior case 2 in order to isolate a radiator, of the optical device of the optical unit 4 from other members.

The cooling unit 3 feeds cooling air to a cooling passage formed within the projector 1 and cools the heat generated in the projector 1. The cooling unit 3 has a sirocco fan 31 located lateral of the projection lens 5 in order to introduce to the interior the cooling air at the exterior of the projector 1 through the air-intake port (not shown) formed in the exterior case 2. The sirocco fan 31 blows the cooling air to the optical device of the optical unit 4, and an axial fan 32 serves as a cooling fan located at the inside of the partition wall 21, formed in the exterior case 2, in order to introduce to the interior the cooling air at the exterior of the projector 1 through the air-intake port (not shown) formed in the exterior case 2. The axial fan 32 blows the cooling air to the radiator of the optical unit 4.

Note that the cooling unit 3 may have a cooling fan (not shown) for cooling the light-source device of the optical unit 4 and the power-source block (not shown), lamp drive circuit and so on, besides the sirocco fan 31 and the axial fan 32.

The optical unit 4 is a unit to optically process the luminous flux emitted from the light source and to form an optical image (color image) corresponding to image information. The optical unit 4 has a generally L-form in plan extending along the back surface of the exterior case 2 and along the side surface of the exterior case 2, as shown in FIG. 1. The detailed structure of the optical unit 4 will be described later.

The projection lens 5 is structured as a combination lens with a plurality of lenses that are combined together. The projection lens 5 is to project, with magnification, an optical image (color image) formed by the optical unit 4 onto a screen, (not shown).

(2) Optical Unit Detailed Structure

The optical unit 2 includes an integrator illumination optical system 41, a color-separation optical system 42, a relay optical system 43, an optical device 44 and an optical-component housing 46. The optical-component housing 46 accommodates therein those optical components 41–43 and an optical-device main body 45 of the optical device 44, as shown in FIG. 1.

The integrator illumination optical system 41 is an optical system for illuminating nearly uniformly the image-forming region of a liquid-crystal panel constituting the optical device 44. The integrator illumination system 41 has a light-source device 411, a first lens array 412, a second lens array 413, a polarization conversion element 414 and a superimposing lens 415, as shown in FIG. 1.

The light-source device 411 has a light-source lamp 416 to emit a radiative beam of light and a reflector 417 to reflect the radiation light emitted from the light-source lamp 416. The light-source lamp 416, in frequent cases, uses a halogen lamp, a metal-halide lamp or a high-pressure mercury lamp. Meanwhile, the reflector 417, although employing a parabolic mirror in FIG. 1, is not limited to using the paroblic mirror. The reflector 417 may be structured by an ellipsoidal mirror, wherein a collimation concave lens being used on a luminous-flux exiting side in order to change the luminous flux reflected by the ellipsoidal mirror into collimated light.

The first lens array 412 has a matrix arrangement of small lenses each having a rectangular contour as viewed in a direction of the optical axis. The small lenses divide the luminous flux emitted from the light-source device 411 into a plurality of fragmentary luminous fluxes.

The second lens array 413 is structured nearly similarly to the first lens array 412. The second lens array 413 has small lenses in a matrix arrangement. The second lens array 413 may focus the small-lens images based on the first lens array 412 onto the liquid-crystal panel of the optical device 44, cooperatively with the superimposing lens 415.

The polarization conversion element 414 is arranged between the second lens array 413 and the superimposing lens 415, to convert the light from the second lens array 413 into nearly one sort of polarization light.

Specifically, the fragmentary portions of light, thus converted into nearly one sort of light by the polarization converter element 414, finally are almost superimposed together on the liquid-crystal panel, of the optical device 44 by the superimposing lens 415.

Because the projector using a liquid-crystal panel of a type to modulate polarization light can afford to utilize solely one sort of polarization light, nearly a half of the light cannot be utilized which is from the light-source device 411 for emitting random polarization light. For this reason, the emission light from the light-source device 411 is converted into nearly one sort of polarization light by use of the polarization conversion element 414, thereby enhancing the light utilization efficiency at the optical device 44.

The color-separation optical system 42 has two dichroic mirrors 421, 422 and a reflection mirror 423, as shown in FIG. 1. This allows separation of a plurality of partial luminous fluxes exited the integrator illumination optical system 41 into three colors, i.e. red, green and blue, of light by the dichroic mirrors 421, 422.

The relay optical system 43 has a light incident-side lens 431, a relay lens 433 and reflection mirrors 432, 434, as shown in FIG. 1. This has a function to guide the red light separated by the color-separation optical system 42 over to the liquid-crystal panel for red light, of the optical device 44.

The luminous flux that has exited the integrator illumination optical system 41 has a blue light component to reflect upon the dichroic mirror 421 of the color-separation optical system 42, while red and green light components are to transmit through the same. The blue light reflected by the dichroic mirror 421 reflects upon the reflection mirror 423, to reach the liquid-crystal panel for blue light, of the optical device 44 by way of a field lens 418. The field lens 418 converts the partial luminous fluxes that have exited the second lens array 413 into a luminous flux parallel with the axis (major beam) thereof. This is true for the other field lenses 418 provided on the light-incident sides of the liquid-crystal panels for green and red.

Of the red and green light transmitted through the dichroic mirror 421, the green light reflects upon the dichroic mirror 422 and reaches the liquid-crystal panel for green light, of the optical device 44 by way of the field lens 418. Meanwhile, the red light transmits through the dichroic mirror 422 and passes the relay optical system 43, to further pass the field lens 418 and reach the liquid-crystal panel for red light, of the optical device 44. The use of the relay optical system 43 for red light is in order to prevent the lower efficiency in light utilization caused by light scatter, etc. because the red-light optical path has a length longer than the optical path of other colors of light, i.e. in order to convey the partial luminous flux entered at the light incident-side lens 431, as it is, to the field lens 418. Although the present embodiment employs such a structure because of the longer optical path of red light, it is possible to have a structure in which the optical path is longer for blue light.

The optical device 44 is formed, in one body, with three liquid-crystal panels 441 (red-light liquid-crystal panel 441R, green-light liquid-crystal panel 441G and blue-light liquid-crystal panel 441B) as light modulation elements, light incident-side polarizers 442 and light exiting-side polarizers 443 as optical conversion elements arranged on the luminous-flux incident and exiting sides of the liquid-crystal panel 441, and a cross dichroic prism 444 as a color combining system, as shown in FIG. 1.

The optical device 44, although its detailed structure is described later, has a main tank, a medium under-pressure supply, a radiator and a medium circulating member besides the optical device main body 45 structured by the liquid-crystal panel 441, the light incident-side polarizer 442, light exiting-side polarizer 443, the cross dichroic prism 444 and so on.

The liquid-crystal panel 441 has a structure in which a liquid crystal as an electro-optical substance is hermetically sealed between a pair of substrates, not shown, formed of glass or the like. Of those, one of the substrates is a driving substrate for driving the liquid crystal, having a plurality of data lines formed in an arrangement parallel one with another, a plurality of scanning lines formed in an arrangement perpendicular to the plurality of data lines, pixel electrodes formed in a matrix arrangement corresponding to the intersections of the scanning and data lines, and switching elements such as TFTs. Meanwhile, the other substrate is a counter substrate arranged opposite to the foregoing substrate with a predetermined spacing, having a common electrode to be applied with a predetermined voltage Vcom. The one pair of substrates are electrically connected with a control device, not shown, thus being connected with a flexible printed board 441E (FIG. 5) for outputting a predetermined drive signal to the scanning line, data line, switching element, common electrode, etc. By inputting a drive signal from the control device through the flexible printed board 441E, a predetermined voltage is applied between the pixel electrode and the common electrode. This effects control of the orientation state of the liquid crystal interposed between the pixel electrode and the common electrode, to modulate the polarization direction of the polarization luminous flux exited at the light incident-side polarizer 442.

The light incident-side polarizer 442, upon which the colors of light aligned nearly in one direction of polarization by the polarization conversion element 414 are incident. Of the incident luminous fluxes, only the polarization light is allowed to transmit which is nearly in the same direction as the polarization axis of the luminous flux aligned by the polarization conversion element 414 while the other luminous flux is absorbed. The light incident-side polarizer 442 has a structure that a viewing-angle correction film and a polarization film (not shown), as optical conversion films, are put on a light-transmissive substrate, such as sapphire glass or crystal, for example.

The light exiting-side polarizer 443 allows only the luminous flux having a polarization axis perpendicular to the transmission axis of the luminous flux through the light incident-side polarizer 442, of the luminous fluxes exited the liquid-crystal panel 441, to transmit while absorbing the other luminous flux. The light exiting-side polarizer 443 has a structure that the viewing-angle correction film and the polarization film (not shown) are put on a light-transmissive substrate, similarly to the light incident-side polarizer 442.

Incidentally, the viewing-angle correction film corrects for a viewing angle of an optical image to be formed on the liquid-crystal panel 441. By providing the viewing-angle correction film, there is an increase of a viewing angle of a projection image with greatly improved contrast in the projection image.

The cross dichroic prism 444 is an optical element to form a color image by combining together the optical images modulated, color by color, and exited the light exiting-side polarizers 443. The cross dichroic prism 444 is generally square in plan having four rectangular prisms bonded together. Two dielectric multi-layer films are formed at the interface of the rectangular prisms that are bonded together. These dielectric multi-layer films are to reflect the color of light exited the liquid-crystal panels 441R, 441B and passed through the light exiting-side polarizer 443 and allow the color of light exited the liquid-crystal panel 441G and passed the light exiting-side polarizer 443 to transmit. In this manner, the colors of light modulated by the liquid-crystal panels 441R, 441G, 441B are combined together, to form a color image.

The optical-component housing 46, structured of a metal member, for example, has a predetermined illumination-light axis A established at the inside thereof, as shown in FIG. 1. Thus, the foregoing optical components 41-43 and the optical device main body, of the optical device 44 are accommodated in a predetermined position relative to the illumination-light axis A. Incidentally, the optical-component housing 46 is not limited to the metal member but may be structured by another material provided that it is a heat conductive material.

The optical-component housing 46, is structured with a container-like component accommodating member to accommodate therein the optical components 41–43 and the optical-device main body of the optical device 44, and a lid-like member for closing the aperture of the component accommodating member.

Of those, the component accommodating member constitutes the bottom, front and side surfaces of the optical-component housing 46.

In the component-accommodating member, three holes (not shown) are formed in the bottom surface corresponding to the positions of the liquid-crystal panels 441 of the optical device 44. The cooling air, introduced to the inside from the exterior of the projector 1 by the sirocco fan 31 of the cooling unit 3, is delivered from the sirocco fan 31 and caused to flow toward the three liquid-crystal panels 441 of the optical device 44 through the three holes.

(3) Optical Device Structure

Figure 2:
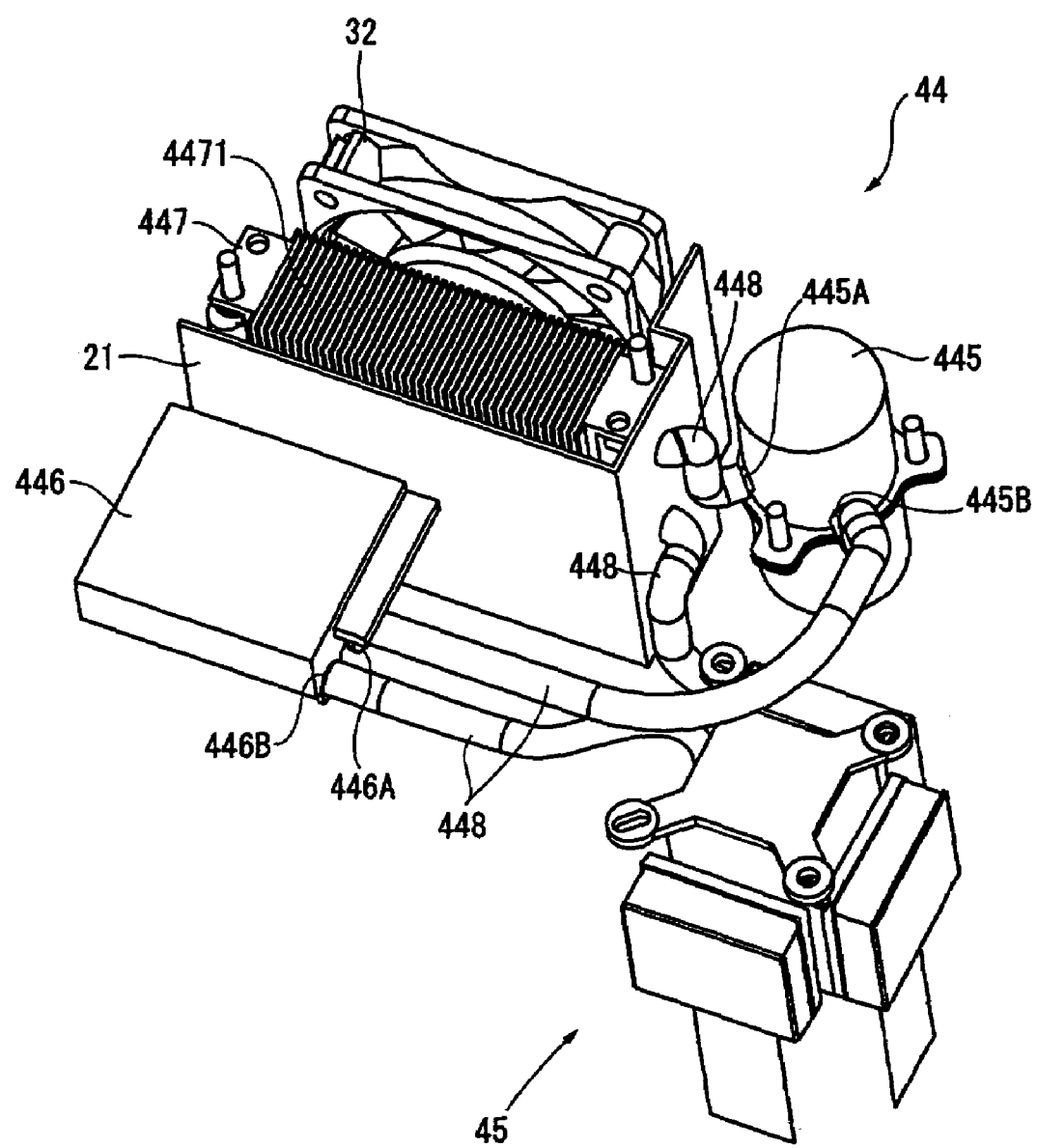
FIG. 2 illustrates a perspective schematic of an optical device in an exemplary embodiment as viewed from below.

FIG. 2 is a perspective schematic of the optical device 44 as viewed from below.

The optical device 44 has the optical-device main body 45 arranged, as a unit, with the liquid-crystal panel 441, the light incident-side polarizer 442, the light exiting-side polarizer 443 and the cross dichroic prism 444, the main tank 445, the medium under-pressure supply 446, the radiator 447 and a plurality of medium circulation members 448, as shown in FIGS. 1 and 2.

Of these, the medium circulation members 448 are structured to flow a coolant such as an ethylene glycol solution through the inside thereof. When the coolant flows through the inside of the medium circulation members 448, the coolant is released of heat. The medium circulation member 448 in this exemplary embodiment is structured by an aluminum-make tubular member but may be formed of a metal such as copper, magnesium or titanium. Otherwise, it may be structured by a heat-conductive synthetic resin or by a resilient member such as rubber. Meanwhile, although this exemplary embodiment employed, as a coolant, ethylene glycol that is a transparent non-volatile solution, another solution may be adopted.

The structure of the optical-device main body 45 is described in detail later.

The main tank 445 is generally cylindrical in form, as shown in FIG. 2. The main tank 445 is structured by two container-like members of aluminum so that the cooling fluid can be temporarily stored therein by connecting the two container-like members together at their apertures.

The main tank 445 is formed, nearly centrally in a direction of a cylinder axis, with a coolant inlet 445A for allowing the coolant to flow in the inside thereof and a coolant outlet 445B for allowing the internal coolant to flow out thereof. The coolant inlet 445A and coolant outlet 445B are respectively connected to the medium under-pressure supply 446 and the radiator 447 through the medium circulation members 448.

The medium under-pressure supply 446, has a structure of an impeller that is arranged within an aluminum hollow member generally in a cuboid form. Due to rotation of the impeller under control of the control device (not shown), the coolant within the main tank 445 flows in the medium under-pressure supply 446 through the medium circulation member 448 so that the coolant introduced is forcibly delivered to the optical-device main body 45 through the medium circulation member 448. For this reason, the medium under-pressure supply 446 is formed with a coolant inlet 446A where the coolant is to flow from the main tank 445 through the medium circulation member 448 and a coolant outlet 446B for allowing the coolant to flow to the optical-device main body 45.

With such a structure, the medium under-pressure supply 446 can be reduced in impeller thickness dimension in a direction of rotation axis, and hence can be arranged within the available space at the inside of the projector 1. In this exemplary embodiment, the medium under-pressure supply 446 is arranged underneath the projection lens 5.

The radiator 447 is arranged inside the partition wall 21 formed in the exterior case 2 as shown in FIGS. 1 and 2, to radiate the heat of the coolant heated by cooling the liquid-crystal panels 441, etc. in the optical-device main body 45. The radiator 447, to which a coolant flows from the optical-device main body 45 through the medium circulation member 448, has an aluminum tubular member for introducing the coolant to the main tank 445 and a radiation fin 4471 in contact, for thermal conduction, with the tubular member. Due to this, the heat of the coolant heated in cooling at the optical-device main body 45 conducts to the fin 4471 during flowing in the tubular member. Here, the fin 4471 is supplied with the cooling air from the axial fan 32 so that the fin 4471 can be cooled by the cooling air. This can effectively cool the coolant.

Figure 3:
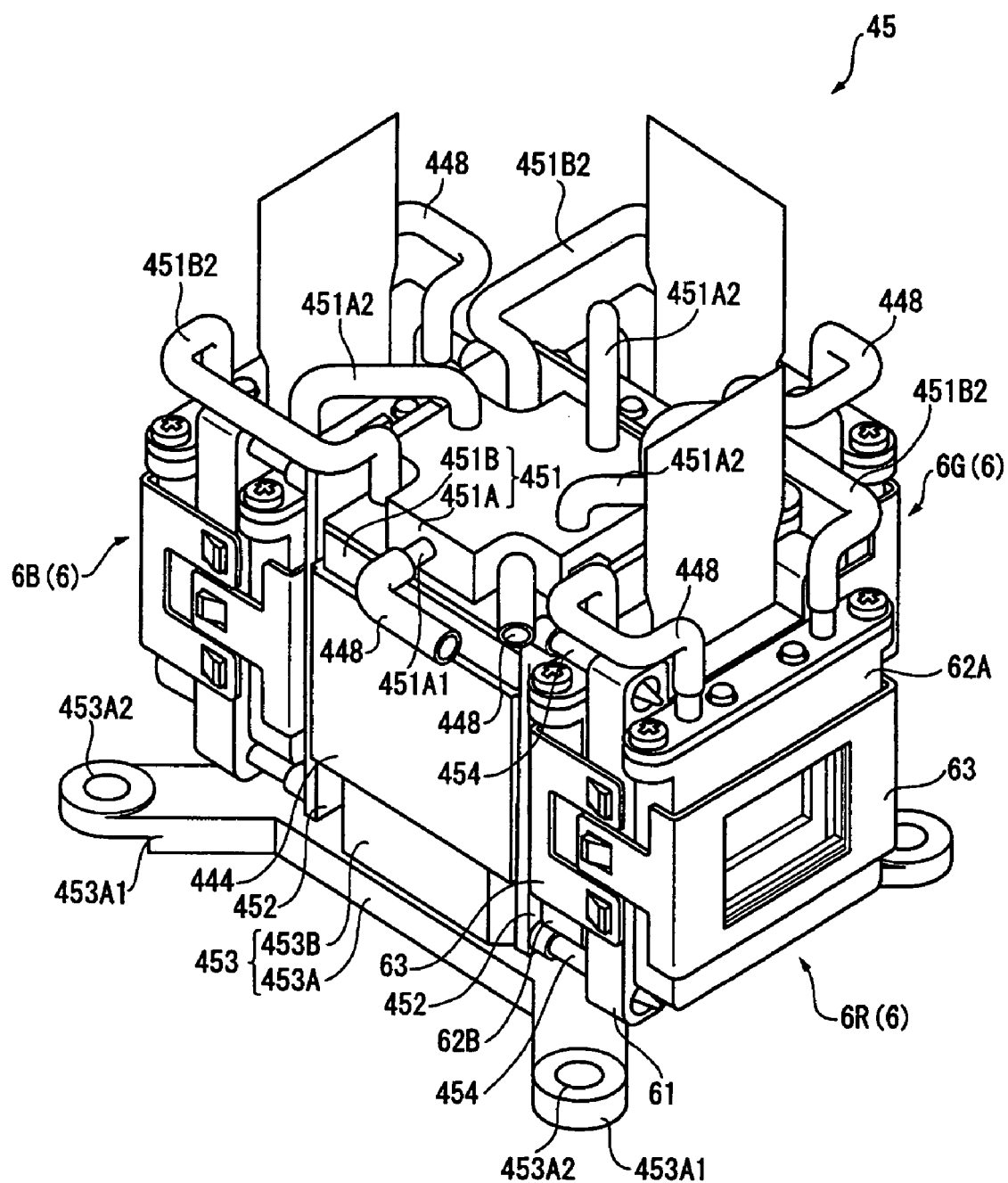
FIG. 3 illustrates a perspective schematic of an optical-device main body in an exemplary embodiment as viewed from above.

FIG. 3 is a perspective schematic of the optical-device main body 45.

The optical-device main body 45 has a cross dichroic prism 444, a linkup member 451 rested on the top surface of the cross dichroic prism 444, three optical conversion devices 6 (optical conversion device 6R for optically converting red light, optical conversion device 6G for optically converting green light, and optical conversion device 6B for optically converting blue light), three optical conversion device supports 452 fixing the optical conversion devices 6 respectively to the optical-flux incident surfaces of the cross dichroic prism 444, and a prism pedestal 453 for resting the cross dichroic prism 444 thereon. Of these, the optical conversion device 6 (6R, 6G, 6B) is structured by a fixture 63 in which the liquid-crystal-panel support frame 61 holding the liquid-crystal panel 441 (441R, 441, 441B) and the cooling device 62 (62A, 62B) holding the light incident-side polarizer 442 and light exiting-side polarizer 443 and cooling the liquid-crystal panel 441, light incident-side polarizer 442 and light exiting-side polarizer 443 are integrated. The optical conversion device 6 is described in detail later.

The linkup member 451, although omitted of its detailed showing, has a structure combining a first linkup 451A and a second linkup 451B that are aluminum hollow members.

The first linkup 451A, constitutes an upper part of the linkup member 451, has one coolant inlet 451A1 connected to the medium under-pressure supply 446 through the medium circulation member 448 and has three coolant supplies 451A2 for supplying the coolant flowed in the first linkup 451A to the cooling device 62 (62B) of the optical conversion device 6.

The second linkup 451B, constitutes a lower part of the linkup member 451, has three coolant inlets 451B2 to which the coolant flows from the cooling devices 62 (62A) of the respective optical conversion devices 6 and a coolant outlet (not shown) connected to the radiator 447 through the medium circulation member 448.

The first linkup 451A and the second linkup 451B are each formed therein with a flow passage for flowing the coolant. Namely, the coolant supplied under pressure from the medium under-pressure supply 446 flows in the first linkup 451 through a coolant inlet 451A1 formed in the first linkup 451A, and then supplied to the cooling device 62 (62B) of the optical conversion device 6 respectively from the three coolant supplies 451A2. Meanwhile, the coolant used in cooling at the cooling device 62 flows into the second linkup 451B from the cooling device 62A through the coolant inlet 451B2 formed at the second linkup 451B, and then delivered from the coolant outlet to the radiator 447 through the medium circulation member 448.

The optical conversion device support 452 is a generally rectangular plate member structured of a heat-conductive material for fixing the optical conversion device 6 on a luminous-flux incident surface of the cross dichroic prism 444. The optical conversion device support 452, although omitted of detailed showing, is formed nearly centrally with an aperture through which the luminous flux emitted from the optical conversion device 6 is to transmit. Meanwhile, the optical conversion device support 452 is formed with recesses at four corners in the surface on the luminous-flux incident side. The recesses are fitted with rod-formed pin spacers 454 in a manner projecting outward of the surface on the luminous-flux-incident side of the optical conversion device support 452. The pin spacer 454 is inserted through the hole 612A (FIG. 5) formed in the liquid-crystal-panel support frame 61 of the optical conversion device 6. After positioning the optical conversion device 6 in position, a cap (not shown), is attached to a tip of the pin spacer 454 to thereby support the optical conversion device 6 on the optical-conversion-device support 452.

The prism pedestal 453 has legs 453A1 extending generally in an X-form. This is structured with a main-body fixer 453A to fix the optical-device main body 45 to the optical-component housing 46, and a rest 453B formed generally cuboidal nearly at a center of the main-body fixer 453A and to rest resting the cross dichroic prism 444 thereon.

Of those, the legs 453A1 formed with the main-body fixer 453A are respectively formed with generally-circular holes 453A2 at the tips thereof. By inserting fixtures such as screws through the holes 453A2, the fixtures may engage with holes (not shown), formed in the optical-component housing 46, thereby fixing the optical-device main body 45 to the optical-component housing 46.

In the upper surface of the rest 453B, a rise is formed, not shown, which rises as a general center is neared. The cross dichroic prism 444 rests on the rise. This facilitates the inclination adjustment of the cross dichroic prism 444 relative to the optical axis of incident luminous flux when fixing the cross dichroic prism 444 by a UV-set, or thermo-set adhesive, or the like.

Figure 4:
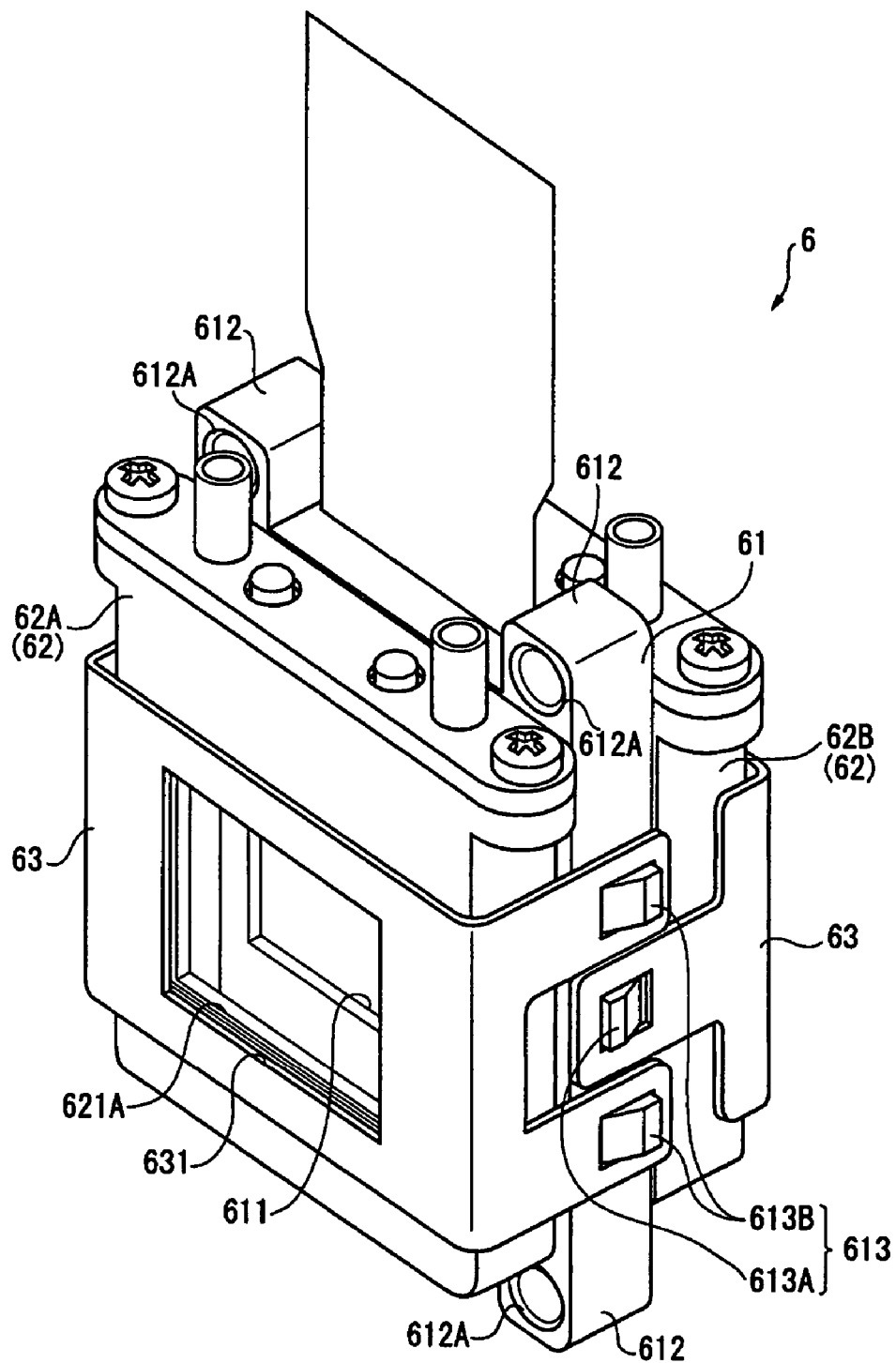
FIG. 4 illustrates a perspective schematic of an optical conversion device in an exemplary embodiment as viewed from above.
Figure 5:
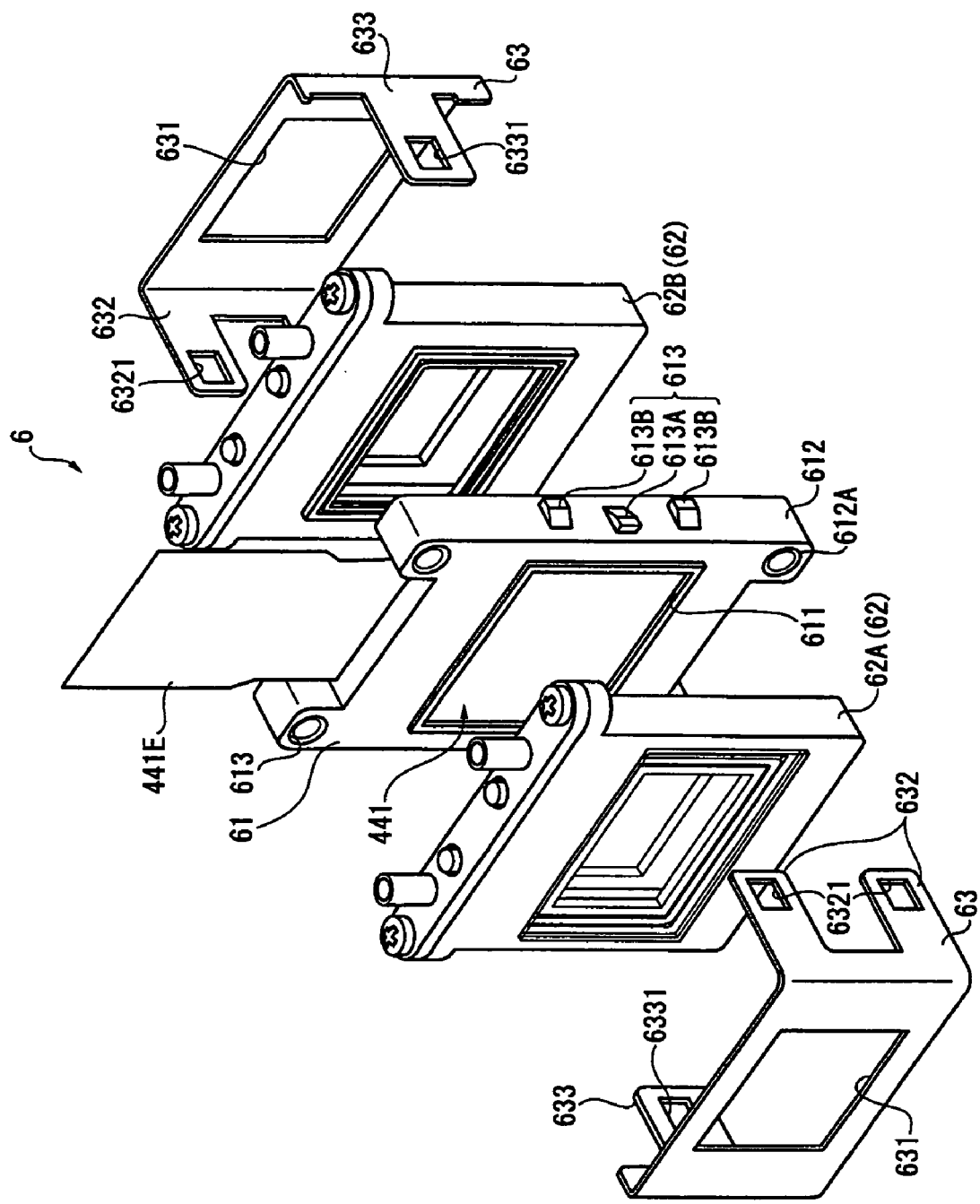
FIG. 5 illustrates exploded perspective schematic of an optical conversion device in exemplary embodiment.

FIG. 4 is a perspective schematic of the optical conversion device 6. FIG. 5 is an exploded perspective schematic of the optical conversion device 6.

The optical conversion device 6 holds, in one body, the liquid-crystal panel 441, the light incident-side polarizer 442 and the light exiting-side polarizer 443, and cools the heat generated in the optical components 441, 442, 443. The optical conversion device 6 has the liquid-crystal-panel support frame 61 holding the liquid-crystal panel 441, the cooling device 62A attached to the liquid-crystal-panel support frame 61 at its luminous-flux incident-side surface, the cooling device 62B similarly attached to the liquid-crystal-panel support frame 61 at its luminous-flux exiting-side surface, and two fixtures 63 to fix the cooling devices 62A, 62B to the liquid-crystal-panel support frame 61.

The structures of the cooling devices 62A, 62B are described in detail later.

The liquid-crystal-panel support frame 61 is a generally H-shaped member structured of a heat-conductive material of aluminum or the like, to constitute a light modulator if combined with the liquid-crystal panel 441. The liquid-crystal-panel support frame 61 is formed therein with an accommodator, not shown, formed in a size nearly equal to the exterior size of the liquid-crystal panel 441. The accommodator is opened in the backside of the liquid-crystal-panel support frame 61, i.e. on the luminous-flux exiting side of the liquid-crystal panel 441 being held. The liquid-crystal panel 441 is received in the accommodator through the accommodator aperture so that the liquid-crystal panel 441 can be held in the liquid-crystal panel support frame 61. Accordingly, the liquid-crystal panel 441 at its luminous-flux exiting surface is exposed toward the backside of the liquid-crystal-panel support frame 61.

Meanwhile, a generally rectangular aperture 611 is formed nearly centrally in a front surface of the liquid-crystal-panel support frame 61, i.e. in a luminous-flux incident side surface of liquid-crystal panel 441 being held. The aperture 611 is a luminous-flux transmission aperture for allowing a luminous flux to enter the liquid-crystal panel 441, to serve as an image-forming region. In the aperture 611, the luminous-flux incident surface of the liquid-crystal panel 441 is exposed.

In the respective extensions 612 extending up and down from the four corners of the liquid-crystal-panel support frame 61, holes 612A are formed extending in the direction of luminous-flux incidence through the liquid-crystal-panel support frame 61. These holes 612A are to be inserted through the liquid-crystal-panel support frame 61 by foregoing pin spacers 454.

Furthermore, engagers 613 are formed nearly centrally widthwise on respective side surfaces of the liquid-crystal-panel support frame 61, where the fixtures 63 engage the engagers 613. Of these engagers 613, an engager formed on one side surface has one engaging projection 613A, and two engaging projections 613B sandwiching the engaging projection 613A. The engager formed on the other side surface has one engaging projection 613B, and two engaging projections 613A sandwiching the engaging projection 613B.

The engaging projections 613A, 613B are respectively formed as generally triangular projections, in section, projecting outward of the surface, which however are different in the direction of formation. Namely, the engaging projection 613A is formed increasing its projection height in a direction from the luminous-flux exiting side to the luminous-flux incident side of the liquid-crystal-panel support frame 61. Conversely, the engaging projection 613B is formed increasing its projection height in a direction from the luminous-flux incident side to the luminous-flux exiting side of the liquid-crystal-panel support frame 61.

The fixture 63 is a plate member generally in a U-form in section, to fix the cooling device 62A, 62B on the liquid-crystal-panel support frame 61, as noted before. The fixture 63 is formed with an aperture 631 nearly at a center thereof, through which a luminous flux is to transmit. Meanwhile, there are formed, at both widthwise ends, extensions 632, 633 extending outward of its surface.

Of these, the extensions 632 are formed generally in a U-form as viewed to the side surface, each formed with an opening 6321 at a tip thereof. The extension 633 is also formed with an opening 6331 at a tip thereof. These openings 6321, 6331 are to be fit with any of the engaging projections 613A, 613B formed in the engager 613 of the liquid-crystal-panel support frame 61.

Namely, in the case where the fixture 63 is to fix the cooling device 62A for arrangement on the liquid-crystal-panel support frame 61 at its luminous-flux incident side, the respective openings 6321, 6331 are fit by the respective engaging projections 613B of the engager 613 formed on the liquid-crystal-panel support frame 61. Conversely, in the case where the fixture 63 is to fix the cooling device 62B for arrangement on the liquid-crystal-panel support frame 61 at its luminous-flux exiting side, the respective openings 6321, 6331 are fit by the engaging projections 613A of the respective engagers 613. This easy to fit the respective fixtures 63 onto the liquid-crystal-panel support frame 61, but makes it not easy for the fixture 63 to be placed out of fitting. Accordingly, the cooling devices 62A, 62B can be fixed positively and easily on the liquid-crystal-panel support frame 61 by way of the fixtures 63.

Figure 6:
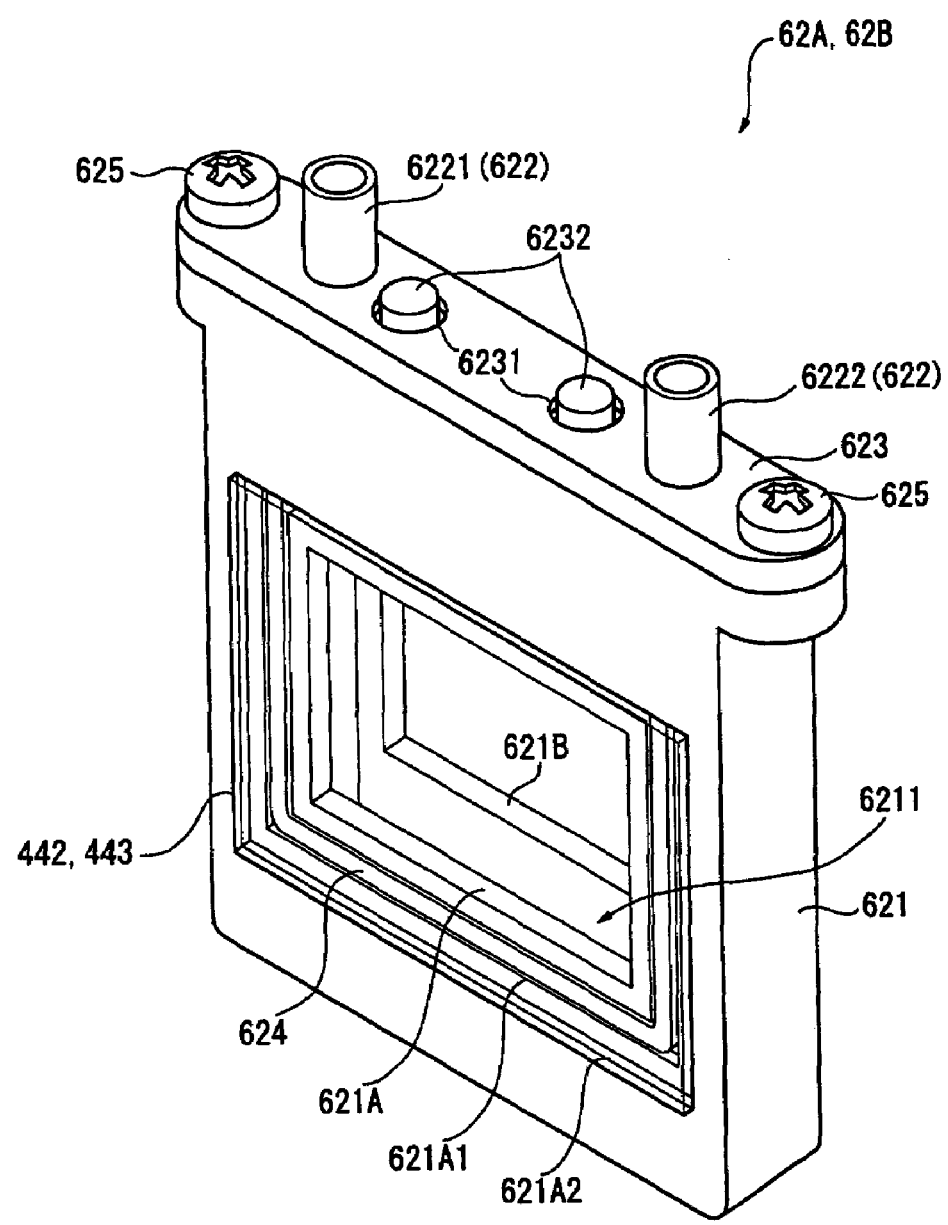
FIG. 6 illustrates a perspective schematic of a cooling device in an exemplary embodiment as viewed from above.
Figure 8:
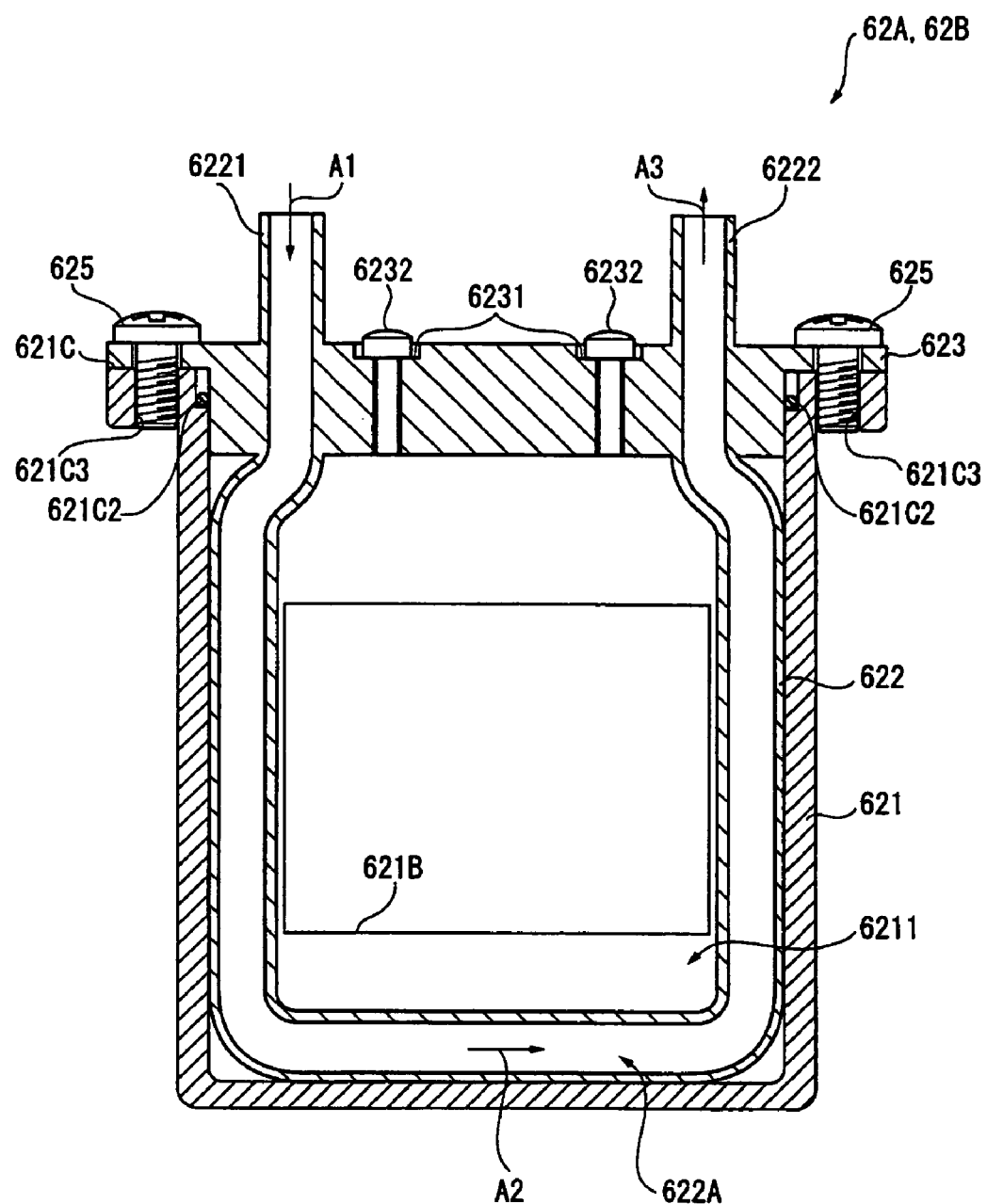
FIG. 8 illustrates a sectional schematic of a cooling device in an exemplary embodiment.

FIG. 6 is a perspective schematic of the cooling device 62 while FIG. 7 is an exploded perspective schematic thereof. FIG. 8 is a sectional schematic of the cooling device 62.

The cooling devices 62 (62A, 62B) are fixed on the liquid-crystal-panel support frame 61, to cool the liquid-crystal panel 441 received in the liquid-crystal-panel support frame 61. Meanwhile, the cooling devices 62 (62A, 62B) respectively support and cool the light incident-side polarizer 442 and the light exiting-side polarizer 443.

Of these, the cooling device 62A has a container-like coolant enclosure 621 to seal therein a coolant, a pipe 622 generally in a U-shape received within the coolant enclosure 621 and allowing the coolant to flow therein, and a fixing member 623 fixing the pipe 622 in the coolant enclosure 621, as shown in FIGS. 6 to 8.

The coolant enclosure 621 is abutted against the liquid-crystal-panel support frame 61, to cool the liquid-crystal panel 441 by way of the coolant sealed therein. The coolant enclosure 621 is formed therein with a cooling chamber 6211 as a first cooling chamber hermetically sealed with a coolant.

Meanwhile, the coolant enclosure 621 is formed with apertures 621A, 621B at its luminous-flux incident and exiting sides, in a position corresponding to the liquid-crystal panel 441 received in the liquid-crystal-panel support frame 61, in order to allow the luminous flux emitted from the light-source device 411 to transmit to the luminous-flux incident surface of the liquid-crystal panel 441.

The aperture 621A, at its periphery, is formed with a strip of first groove 621A1 in a manner surrounding the aperture 621A. A second groove 621A2 is formed smaller in depth than the first groove 621A1, in a manner surrounding the first groove 621A1.

The first groove 621A1 is attached with a resilient member 624, such as, for example, rubber, formed nearly rectangular to the form of the first groove 621A1 and centrally with an aperture for the luminous flux to transmit therethrough. Meanwhile, the second groove 621A2 is fit with a light incident-side polarizer 442 in a manner abutting against the resilient member 624. Namely, the resilient member 624 is a packing preventing the coolant sealed in the cooling chamber 6211 of the coolant enclosure 621 from leaking at the aperture 621A.

In the periphery of the aperture 621B, a groove is also formed similar to the first groove 621A1, although omitted of showing. This groove is attached with a resilient member 624, which resilient member 624 is abutted against the liquid-crystal panel 441 at its luminous-flux incident surface. Due to this, when the coolant hermetically sealed in the cooling chamber 6211 of the coolant enclosure 621 is placed in direct contact with the liquid-crystal panel 441, the coolant can be prevented or discouraged from leaking at the aperture 621B.

The coolant enclosure 621 has a top surface 621C on which the fixing member 623 having a pipe 622 is fixed. An aperture 621C1 is formed nearly central of the top surface 621C, to receive the pipe 622 in the cooling chamber 6211. Meanwhile, holes 621C3 are respectively formed at both ends widthwise of the top surface 621C.

The aperture 621C1 is formed nearly rectangular and in communication with the cooling chamber 6211. This aperture 621 C1 is formed with a step, not shown, directed toward the interior, a resilient member 621C2 similar to the foregoing resilient member 624 is attached on the step region. This can prevent or discourage the coolant within the cooling chamber 6211 from leaking at the aperture 621C1.

Meanwhile, the two holes 621C3 are structured as screw holes in which screws 625 are to be screwed when the fixing member 623 is fixed to the top surface 621C.

The fixing member 623 is fixed such that the fixing member 623, at its bottom surface, is abutted against the top surface 621C of the coolant enclosure 621. In this case, the pipe 622 provided on the fixing member 623 is received in the cooling chamber 6211 formed within the coolant enclosure 621.

The pipe 622 is a heat-conductive tubular member generally in a U-form, in which a coolant is allowed to flow therein. The pipe 622 has an interior space 622A corresponding to a second cooling chamber of the invention. The pipe 622 is formed with a medium inlet 6221 where the coolant flows into the pipe 622 and a medium outlet 6222 where the coolant entered at the medium inlet 6221 is to be discharged after flowing in the pipe 622. The medium inlet 6221 and the medium outlet 6222 are exposed at the upper surface 623A of the fixing member 623.

Incidentally, the pipe 622, although made of copper in this embodiment, may be formed of a metal such as aluminum, magnesium and titanium, or of a synthetic resin or the like.

Meanwhile, the fixing member 623 at its upper surface 623A is formed with two medium supply ports 6231 in a manner sandwiched by the medium inlet 6221 and medium outlet 6222 of the pipe 622, to supply a coolant to the cooling chamber 6211 of the coolant enclosure 621. Caps 6232 are respectively attached on the medium supply ports 6231. Namely, after the fixing member 623 is fixed to the coolant enclosure 621 and the cooling device 62 is fixed to the liquid-crystal-panel support frame 61, the coolant is fed to the cooling chamber 6211 through the medium supply ports 6231. After the cooling chamber 6211 is filled with the coolant, the medium supply ports 6231 are closed by the caps 6232.

Furthermore, at both ends widthwise of the upper surface 623A, holes 6234 are formed, each vertically penetrating the fixing member 623. The holes 6234 may be inserted by screws 625 for screwing in the holes 621C3 formed in the upper surface 621C of the coolant enclosure 621. This fixes the fixing member 623 to the coolant enclosure 621.

When the fixing member 623 is fixed to the coolant enclosure 621, the pipe 622 held by the fixing member 623 is arranged avoiding the aperture 621A, 621B formed in the coolant enclosure 621. Namely, the pipe 622 is received in the cooling chamber 6211 in a manner surrounding a luminous-flux transmission region where the luminous flux is to transmit from the aperture 621A to the aperture 621B. Due to this, the pipe 622 is received not to lie within the luminous-flux transmission region.

In the cooling device 62A thus structured, the coolant hermetically sealed in the cooling chamber 6211 of the coolant enclosure 621 is to be placed in direct contact with the luminous-flux incident surface of the liquid-crystal panel 441 and the light incident-side polarizer 442, as shown in FIG. 8. Thus, the liquid-crystal panel 441 and the light incident-side polarizer 442 can be cooled effectively. Here, the heat of the coolant served in cooling the liquid-crystal panel 441 and light incident-side polarizer 442 is allowed to conduct to the heat-conductive pipe 622 similarly received in the cooling chamber 6211. In the pipe 622, another coolant, fed under pressure from the medium under-pressure supply 446 through the linkup member 451, flows in a direction of arrow A1 through the medium inlet 6221. The relevant coolant cools the coolant introduced in the pipe 622 within the cooling chamber 6211 while flowing in a direction of arrow A2 in the pipe 622, to be discharged in a direction of arrow A3 through the medium outlet 6222.

Because the coolant in the cooling chamber 6211 can be cooled by the coolant flowing in the pipe 622, the coolant in the cooling chamber 6211 can be kept at a low temperature. Thus, the liquid-crystal panel 441 at its luminous-flux incident surface and the light incident-side polarizer 442 can be cooled effectively. Meanwhile, because the pipe 622 is arranged in a manner surrounding the luminous-flux transmission region where transmission is to be effected through the apertures 621A, 621B of the coolant enclosure 621, the contact area can be increased with the coolant of the cooling chamber 6211 while the pipe 622 can be placed not to lie in the luminous-flux transmission region. Accordingly, because heat exchange ratio can be improved between the coolant in the cooling chamber 6211 and the coolant in the pipe 622, cooling efficiency can be improved, enhanced and/or optimized on the liquid-crystal panel 441 and light incident-side polarizer 442.

Meanwhile, the coolant in the cooling chamber 6211, for cooling the liquid-crystal panel 441 and light incident-side polarizer 442, is hermetically sealed to convect only within the cooling chamber 6211. The relevant coolant is cooled by the coolant flowing in the pipe 622. However, because the relevant coolant flows in the pipe 622, there is no transmission of a luminous flux through the coolant. Due to this, where color change occurs in the coolant flowing in the pipe 622 due to thermal deterioration, etc. during the flow process and even where impurities are mixed in the coolant, there is no direct contact with the coolant in the cooling chamber 6211 through which the luminous flux is to transmit wherein there is no transmission of a luminous flux. Hence, the coolant color change and impurity mixing in the coolant can be prevented from having an effect upon an optical image formed by the liquid-crystal panel 441. Accordingly, even where color change, etc. occur due to circulation of the coolant, stable optical image formation is possible without having effects formed upon an optical image.

Furthermore, because the coolant flowing in the pipe 622 is free from transmission of a luminous flux for utilization in optical image formation, the coolant in circulation must not be transparent and colorless. This can broaden the scope of selecting a coolant for circulation, to reduce the manufacturing cost for the optical device 44 by use of an inexpensive coolant.

The cooling device 62B, fixed on the liquid-crystal-panel support frame 61 at its luminous-flux exiting side, has the same structure as the cooling device 62A fixed on the luminous-flux incident side, as shown in FIGS. 6 to 8. However, there is a difference in that the cooling device 62A holds the light incident-side polarizer 442 while the cooling device 62B holds the light exiting-side polarizer 443.

Meanwhile, the aperture 621B, on the opposite side to the aperture 621A holding light exiting-side polarizer 443 of the coolant enclosure 621 structuring the cooling device 62B, is arranged in a manner contacting with the luminous-flux exiting surface of liquid-crystal panel 441, as shown in FIGS. 4 and 5. The coolant, hermetically sealed within the coolant enclosure 621 of the cooling device 62B, is placed in direct contact with the luminous-flux exiting surface of liquid-crystal panel 441 thereby cooling the liquid-crystal panel 441.

The cooling device 62B thus structured can exhibit the similar effect to the foregoing cooling device 62A. Namely, the liquid-crystal panel 441 at its luminous-flux exiting surface and the light exiting-side polarizer 443 can be directly cooled by the coolant in the cooling chamber 6211. Meanwhile, the coolant served in cooling the liquid-crystal panel 441 and light exiting-side polarizer 443 and hence heated is cooled by the other coolant flowing in the pipe 622 arranged similarly in the cooling chamber 6211. This can keep the coolant in the cooling chamber 6211 at a low temperature, thereby enabling to efficiently cool the luminous-flux exiting surface of liquid-crystal panel 441 and the light exiting-side polarizer 443. Furthermore, the pipe 622 is arranged avoiding the luminous-flux transmission region of the coolant enclosure 621, and furthermore the pipe 622 demarcates the coolant flowing in the pipe 622 and the coolant in the cooling chamber 6211. Accordingly, even in a case where there is a color change or the like in the flowing coolant, the optical image formed by the liquid-crystal panel 441 can be prevented or discouraged from deteriorating.

Here, as shown in FIG. 3, the medium inlet 6221 of the cooling device 62B on the luminous-flux exiting side of the liquid-crystal-panel support frame 61 is connected to the coolant supplies 451A2 formed on the first linkup 451A of the linkup member 451, while the medium outlet 6222 is connected to the coolant inlet 6221 of the cooling device 62A on the luminous-flux exiting side of the liquid-crystal-panel support frame 61 by way of a medium circulation member 448 as a flow-passage connection member. Meanwhile, the medium outlet 6222 of the cooling device 62A is connected to the coolant inlet 451B2 formed on the second linkup 451B of the linkup member 451 through the medium circulation member 448.

Namely, the coolant fed under pressure from the medium under-pressure supply 446 is supplied to the first linkup 451A of the linkup member 451, and then delivered from the coolant supplies 451A2 of the first linkup 451A to the medium inlet 6221 of the cooling device 62B arranged on the luminous-flux exiting side of the liquid-crystal panel 441, thus flowing in the pipe 622 of the cooling device 62B. On this occasion, delivery is from the medium outlet 6222 to the medium inlet 6221 of the cooling device 62A arranged on the luminous-flux incident side of the liquid-crystal panel 441 through the medium circulation member 448 while cooling the coolant hermetically sealed in the cooling chamber 6211. The coolant delivered to the medium inlet 6221 flows in the pipe 622 of the cooling device 62A, and discharged at the medium outlet 6222 while cooling the coolant within the cooling chamber 6211. Because the medium outlet 6222 is connected to the coolant inlet 451B2, not shown, formed in the second linkup 451B of the linkup member 451, the coolant discharged at the medium outlet 6222 of the cooling device 62A is delivered to the second linkup 451B through the coolant inlet 451B2. The coolant delivered to the second linkup 451B is delivered from the coolant discharger (not shown) to the radiator 447 through the medium circulation member 448.

In this manner, because the coolant fed under pressure from the medium under-pressure supply 446 is delivered to the cooling device 62B through the linkup member 451, the liquid-crystal panel 441 and the light exiting-side polarizer 443 can be cooled efficiently. Here, of the light incident-side polarizer 442 and the light exiting-side polarizer 443, the tendency of temperature increase is higher on the light exiting-side polarizer 443. Consequently, these can be effectively cooled by first supplying the cooling device 62B with the coolant fed under pressure from the medium under-pressure supply 446. Meanwhile, this can suppress the light exiting-side polarizer 443 from thermally deteriorating, hence enabling to stably form an optical image.

2. Second Exemplary Embodiment

Now, explanation is made of the projector optical device according to a second exemplary embodiment of the invention. The optical device in the second exemplary embodiment has a structure nearly the same as the optical device of the first exemplary embodiment but has a difference in the structure of the optical conversion device of the optical-device main body. Note that, in the ensuing explanation, the identical components or nearly identical components to those already described are referenced with the same reference numerals.

Figure 9:
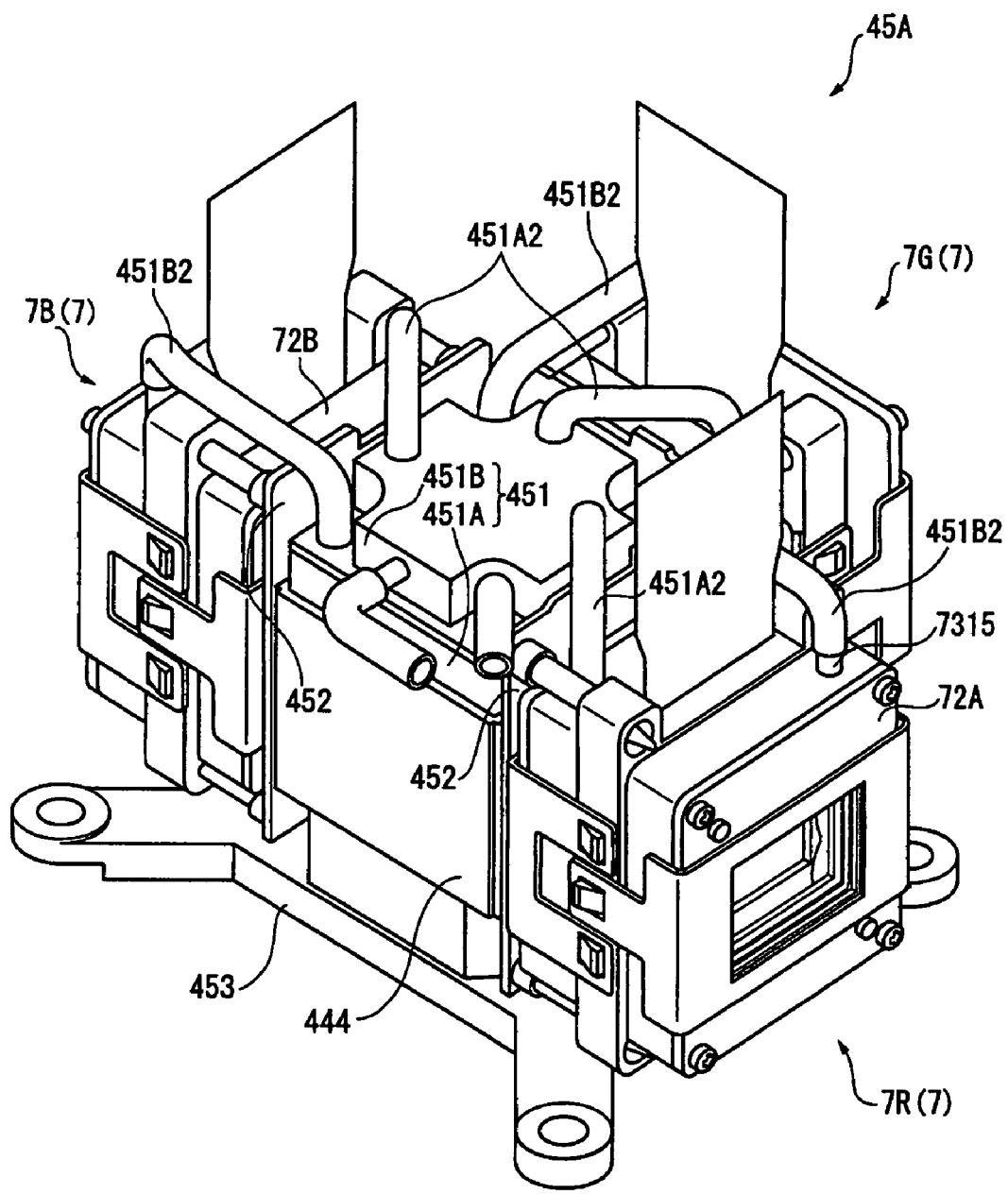
FIG. 9 illustrates a perspective schematic of an optical-device main body according to a second exemplary embodiment of the invention as viewed from above.

FIG. 9 is a perspective schematic of an optical-device main body 45A in the second exemplary embodiment.

The optical-device main body 45A of optical device 44 in the second exemplary embodiment is different as that described in the first exemplary embodiment, in that having an optical conversion device 7 from the optical-device main body 45 having the optical conversion device 6 is nearly the same as the optical-device main body 45. Namely, the optical-device main body 45A has a cross dichroic prism 444, a linkup member 451 resting upon the cross dichroic prism 444, three optical conversion devices 7 (optical conversion device 7R for optically converting red light, optical conversion device 7G for optically converting green light and optical conversion device 7B for optically converting blue light), optical-conversion-device support 452 attaching these optical conversion devices 7 on the cross dichroic prism 444 at its respective luminous-flux incident surface, and a prism pedestal 453 upon which the cross dichroic prism 444 is fixedly rested, as shown in FIG. 9.

Figure 10:
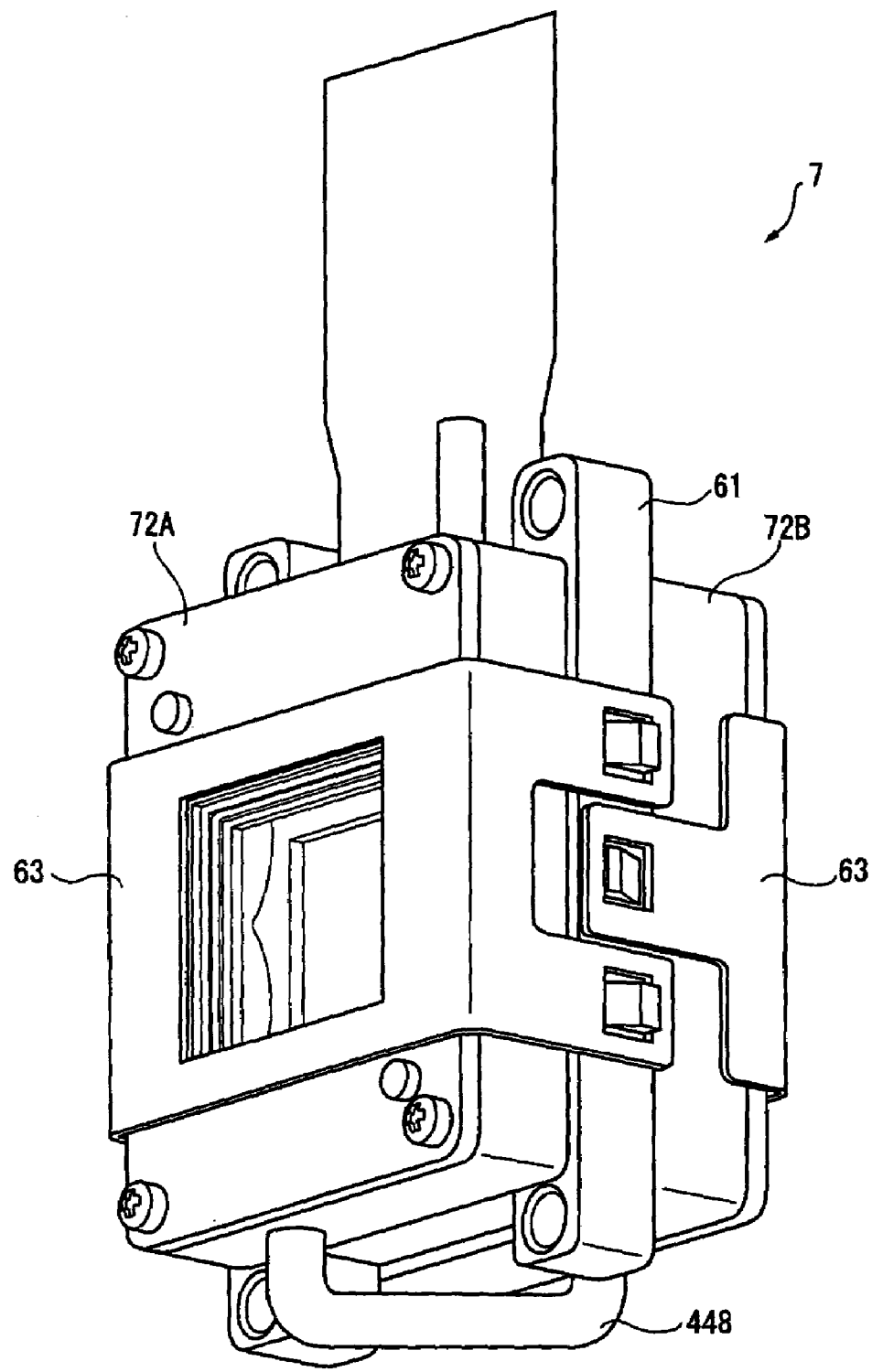
FIG. 10 illustrates a perspective schematic of an optical conversion device in an exemplary embodiment.
Figure 11:
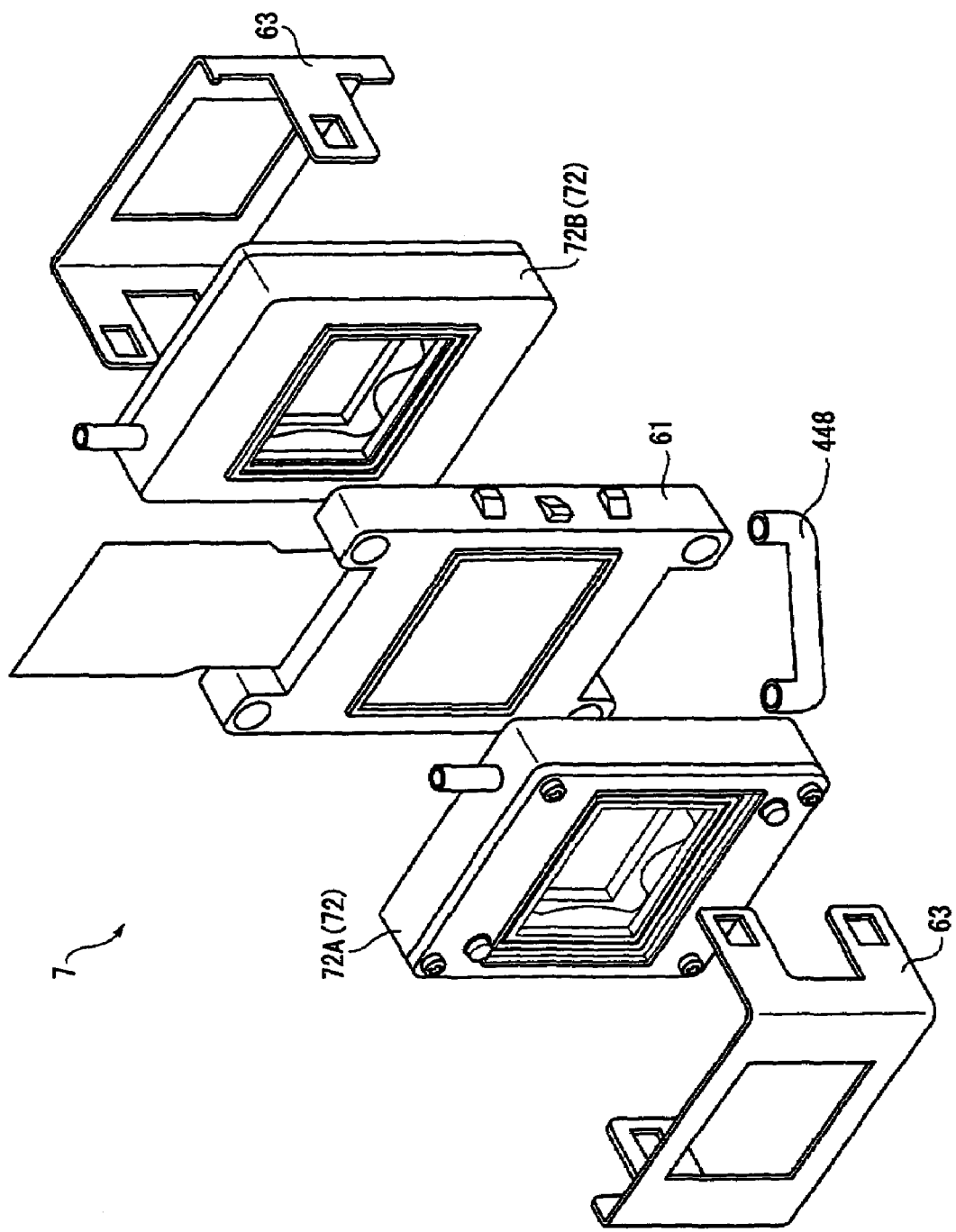
FIG. 11 illustrates an exploded perspective schematic of an optical conversion device in an exemplary embodiment.

FIG. 10 is a perspective schematic of the optical conversion device 7. FIG. 11 is an exploded perspective schematic of the optical conversion device 7.

The optical conversion device 7 has a liquid-crystal-panel support frame 61 holding the liquid-crystal panel 441, cooling devices 72 (72A, 72B) arranged on the liquid-crystal-panel support frame 61 on its luminous-flux incident and exit sides, and a fixture 63 fixing the cooling devices 72 (72A, 72B) on the liquid-crystal-panel support frame 61, as shown in FIGS. 10 and 11. A connection is made between a medium outlet, referred to later, of the cooling device 72B arranged on the luminous-flux exiting side of the liquid-crystal-panel support frame 61, and a medium inlet of the cooling device 72A arranged on the luminous-flux incident side thereof, by a medium circulation member 448 as a flow-passage connecting member.

Figure 13:
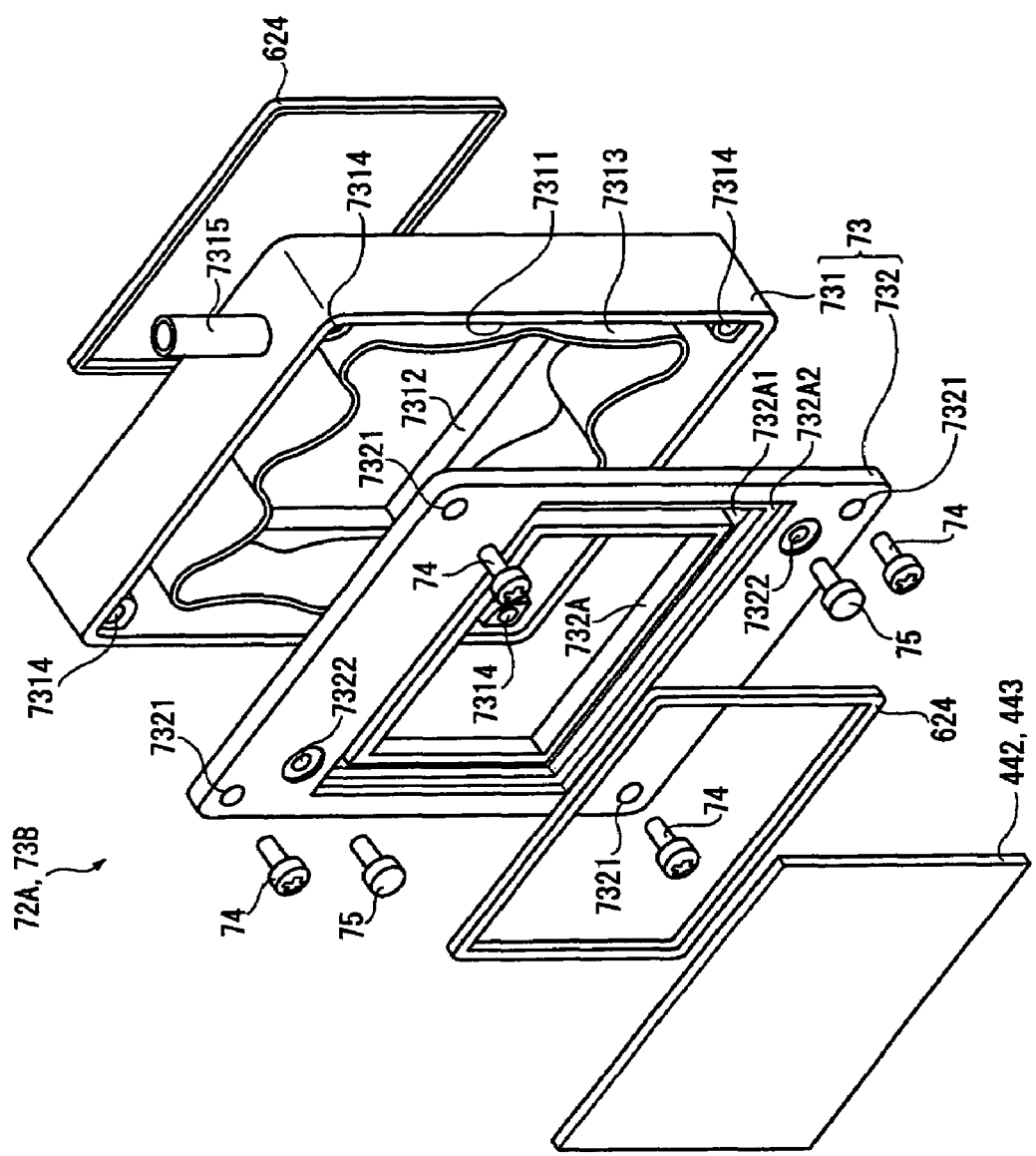
FIG. 13 illustrates an exploded perspective schematic of a cooling device in an exemplary embodiment.
Figure 14:
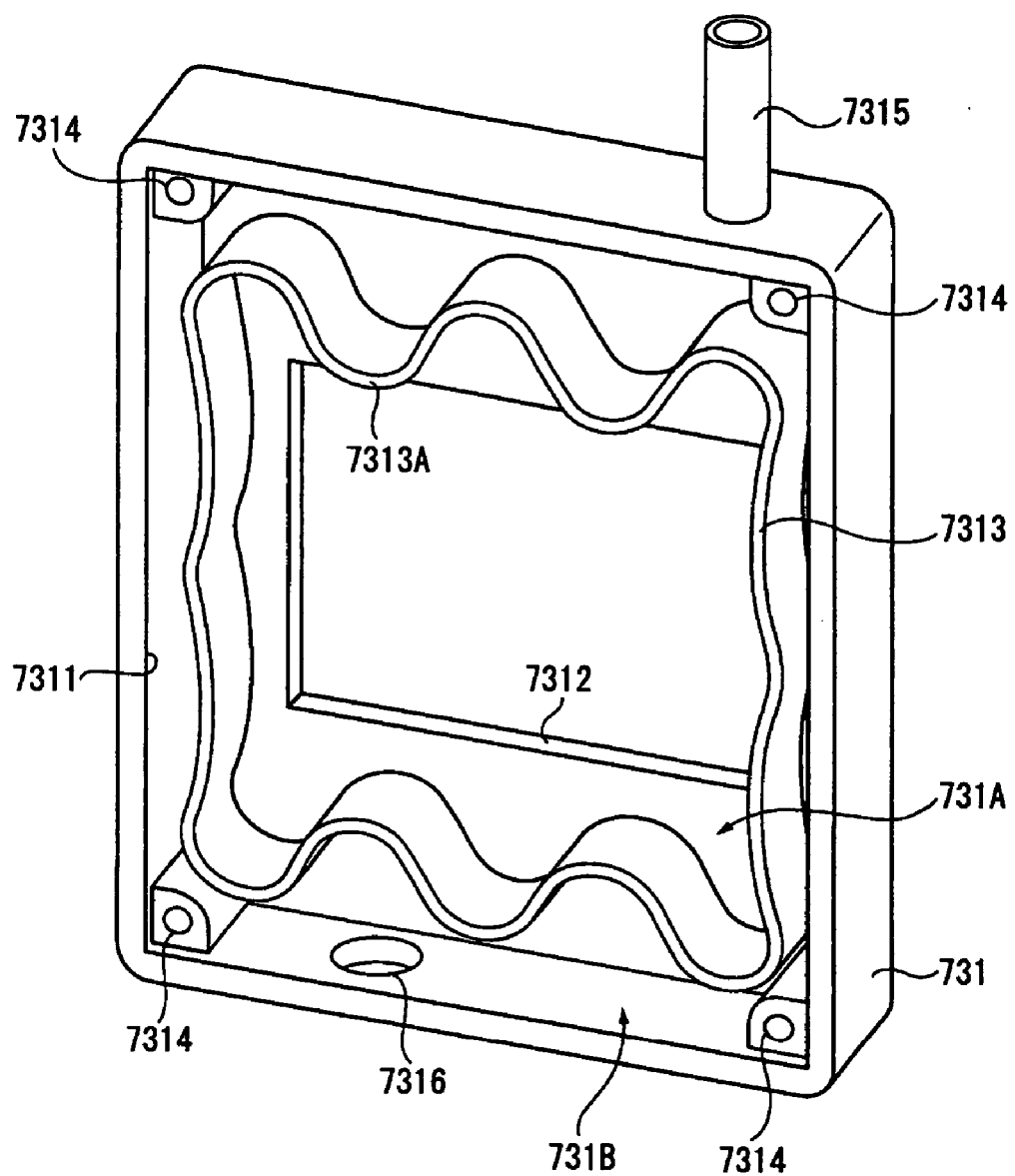
FIG. 14 illustrates a perspective schematic of the interior structure of a first enclosure member in an exemplary embodiment.

FIG. 12 is a perspective schematic of the cooling device 72. FIG. 13 is an exploded perspective schematic of the cooling device 72. FIG. 14 is a perspective schematic showing the interior of a first enclosure member 731 of a coolant enclosure 73 constituting the cooling device 72.

The cooling devices 72A, 72B are respectively fixed on the liquid-crystal-panel support frame 61 at its luminous-flux incident and exiting sides by fixtures 63 as noted before, to cool the liquid-crystal panel 441 received in the liquid-crystal-panel support frame 61 at the luminous-flux incident and exiting sides respectively. The cooling devices 72A, 72B hold and cool a light incident-side and a light exit-side polarizer 443, respectively.

These cooling devices 72A, 72B have a coolant enclosure 73, as shown in FIGS. 12 to 14.

The coolant enclosure 73 is formed in a generally rectangular container, to seal therein a coolant to cool the liquid-crystal panel 441 and light incident-side polarizer 442. The coolant enclosure 73 has a first enclosure member 731 opened in one surface, i.e. surface on the luminous-flux incident side, and a second enclosure member 732 closing the opening in the first enclosure member 731.

The first enclosure member 731 is a generally rectangular box member formed of a metal such as aluminum, as shown in FIGS. 13 and 14. The first enclosure member 731 is formed with apertures 7311, 7312 in the surface opposite to the second enclosure member 732 and the surface opposite to that surface, respectively.

Of those, the aperture 7311 is fixed, by abutment, with the second enclosure member 732 thus being closed.

The aperture 7312 is formed in a position corresponding to the liquid-crystal panel 441 exposed out of the aperture 611 of the liquid-crystal-panel support frame 61. At the periphery of the aperture 7312 in the exterior surface of the first enclosure member 731 forming the aperture 7312, there is formed a groove similar to the foregoing first groove 621A1 of the coolant enclosure 621 though not shown. a resilient member 624 is attached in the groove. The resilient member 624 is abutted against the luminous-flux incident surface of the liquid-crystal panel 441 when attaching the cooling device 72A to the liquid-crystal-panel support frame 61, and abutted against the luminous-flux exiting surface of the liquid-crystal panel 441 when attaching the cooling device 72B to the liquid-crystal-panel support frame 61.

At the interior of the first enclosure member 731, there is formed a partition wall 7313 having a corrugated winding 7313A. The partition wall 7313 is formed integral with the first enclosure member 731 in a manner surrounding around the aperture 7312. Of the two spaces defined by the partition wall 7313 in the first enclosure member 731, the inner space is a first cooling chamber 731A hermetically sealed with a coolant to cool the liquid crystal panel 441, the light incident-side polarizer 442 or the light exiting-side polarizer 443. The outer space is structured as a second cooling chamber 731B through which the coolant fed under pressure from the medium under-pressure supply 446 is allowed to flow in order to cool the coolant of the first cooling chamber 731A.

Here, by integrally forming the partition wall 7313 with the first enclosure member 731, there is no need to provide a new member to define the first cooling chamber 731A and the second cooling chamber 731B. Thus, the coolant enclosure 73 can be simplified in structure.

The winding 7313A, formed on the partition wall 7313 and protruding toward the inner and outer, is to increase the contact area, with the partition wall 7313, of the coolant sealed in the first cooling chamber 731A and the coolant passing the second cooling chamber 731B. This makes it easy to conduct the heat of the coolant of the first cooling chamber 731A to the partition wall 7313. The partition wall 7313 can be readily cooled by the coolant flowing through the second cooling chamber 7311B. Accordingly, by forming the winding 7313A, the contact area is increased with the coolant to thereby increase the cooling efficiency of the coolant of the first cooling chamber 731A. This can improve the efficiency of cooling the liquid crystal panel 441 and the light incident-side polarizer 442 and light exiting-side polarizer 443 by use of the coolant of the first cooling chamber 731.

The first enclosure member 731 is formed with screw holes 7314 respectively at four corners thereof facing the second enclosure member 732. Screws 74 are screwed in the four screw holes 7314 in a state in which the second enclosure member 732 is placed.

The first enclosure member 731, at its upper and lower surfaces, is formed with a medium passage 7315 and medium passage port 7316 for flowing the coolant to the second cooling chamber 731B. Of those, the medium passage port 7316 is attached with a medium circulation member 448, to connect between the medium passage ports 7316 of the cooling devices 72A, 72B.

The second enclosure member 732 is a plate member formed nearly rectangular matched to the outer shape of the first enclosure member 731, to close the aperture 7311 of the first enclosure member 731, as shown in FIGS. 12 and 13. Further, the second enclosure member 732 may be formed with a step (not shown) matched to the shape of the aperture 7311 of the first enclosure member 731, in the surface facing the first enclosure member 731. The step is fit in the aperture 7311. At the fit region, fitting is through a seal member, such as a packing. a seal member, such as a packing, is similarly interposed between the second enclosure member 732 and the surface of a partition wall 7313 formed in the first enclosure member 731 facing the second enclosure member 732. Thus, the coolant in the first cooling chamber 731A defined by the partition wall 7313 is prevented or discouraged from leaking to the second cooling chamber 731B.

The second enclosure member 732 is formed nearly central with an aperture 732A in a position corresponding to the aperture 7312 formed in the first enclosure member 731. The aperture 732A, at its periphery in a surface opposite to the first enclosure member 731, is formed with a first groove 732A1 and second groove 732A2 similar to the first groove 621A1 and second groove 621A2 formed at the periphery of the aperture 621A of the foregoing coolant enclosure 621. Of these, an elastic member 624 is fit in the first groove 732A1. In a manner abutting against the elastic member 624, a light incident-side polarizer 442 for the cooling device 72A or a light exiting-side polarizer 443 for the cooling device 72B is fit in the second groove 732A2.

There are formed holes 7321 for the screws 74 to be inserted through, in four corners of the surface formed with the first groove 732A1 and second groove 732A2. Consequently, the first enclosure member 731 and the second enclosure member 732 can be fixed together by screwing the screws 74 in the screw holes 7314 formed in the first enclosure member 731 through the holes 7321 in the state in which the second enclosure member 732 is abutted against the first enclosure member 731.

Meanwhile, two holes 7322 are formed on a diagonal line in the surface of the second enclosure member 732 formed with the first groove 732A1 and the second groove 732A2. These holes 7322 are holes communicating with the first cooling chamber 731A formed in the first enclosure member 731, to supply the coolant to the first cooling chamber 731A. Accordingly, by supplying coolant through the holes 7322 after fixing the cooling device 72 on the liquid-crystal-panel support frame 61, the first cooling chamber 731A is filled with coolant. The relevant coolant, in the cooling device 72A, is in contact with the luminous-flux incident-surface of the liquid-crystal panel 441 and the light incident-side polarizers 442 and, in the cooling device 72B, is in contact with the luminous-flux exiting-surface of the liquid-crystal panel 441 and the light exiting-side polarizers 443.

Incidentally, caps 75 are attached to these holes 7322 after supplying the coolant, to prevent the coolant hermetically sealed in the first cooling chamber 731A from leaking.

The medium passage 7315 of the cooling device 72B is connected to a coolant supplies 451A2 formed in the first linkup 451A of the linkup member 451 connected to the medium under-pressure supply 446, as shown in FIG. 9. Meanwhile, the medium passage port 7316 of the cooling device 72B is connected to the medium passage port 7316 of the cooling device 72A through a medium circulation member 448, as shown in FIGS. 10 and 11. Furthermore, the medium passage 7315 of the cooling device 72A is connected to the coolant inlet 451B2 formed in the second linkup 451B of the linkup member 451, as shown in FIG. 9.

Due to this, the coolant fed under pressure from the medium under-pressure supply 446 passes the first linkup 451A of the linkup member 451 and flows in the second cooling chamber 731B through the medium passage 7315 of the cooling device 72B fixed on the liquid-crystal panel support frame 61 at its luminous-flux exiting side, thus reaching the medium passage port 7316. On this occasion, the partition wall 7313 formed in the first enclosure member 731 is conducted with a heat of the coolant, within the first cooling chamber 731A, having cooled the luminous-flux exiting surface of liquid-crystal panel 441 and the light exiting-side polarizer 443. Thus, the coolant, flowing along the partition wall 7313 in the second cooling chamber 731B, cools the heat conducted to the partition wall 7313 thereby cooling the coolant of the first cooling chamber 731A.

The coolant that reaches the medium passage port 7316 of the cooling device 72B is fed to the medium passage port 7316 of the cooling device 72A fixed on the liquid-crystal-panel support frame 61 at its luminous-flux incident side through the medium circulation member 448. The cooling medium fed to the medium passage port 7316 of the cooling device 72A flows along the partition wall 7313 in the second cooling chamber 731B reverse to the case in the cooling device 72B, and flows toward the medium passage 7315 while cooling the coolant of first cooling chamber 731A heated by cooling the luminous-flux incident surface of liquid-crystal panel 441 and the light incident-side polarizer 442. The coolant that reaches the medium passage 7315 flows toward the radiator 447 through the second linkup 451B of the linkup member 451.

Due to this, because the coolant is first supplied to the cooling device 72B fixed on the liquid-crystal-panel support frame 61 at its luminous-flux exiting side similarly to the case of the optical conversion device 6, cooling can be effectively made for the luminous-flux exiting surface of liquid-crystal panel 441 and the light exiting-side polarizer 443 that are in a high tendency toward temperature increase. Accordingly, besides the capability of stabilizing optical image formation, the product lifetime of those can be increased. Further, because the coolant passage route can be unified in the optical conversion device 7, the optical device 44 can be simplified in structure.

The cooling devices 72A, 72B can exhibit an effect nearly similar to the foregoing cooling devices 62A, 62B.

Namely, the coolant hermetically sealed in the first cooling chamber 731A cools the liquid-crystal panel 441 and the light incident-side polarizer 442 or light exiting-side polarizer 443. On this occasion, the coolant heated in cooling the optical components 441, 442, 443 is cooled by the coolant flowing in the second cooling chamber 731B through the partition wall 7313. Due to this, because the coolant in the first cooling chamber 731A can be kept at low temperature, cooling can be effectively made for the liquid-crystal panel 441, the light incident-side polarizer 442 and the light exit-side polarizer 443.

Meanwhile, because the partition wall 7313 is formed in a manner surrounding the aperture 7311, there is no possibility that the coolant passing the second cooling chamber 731B flows in the luminous-flux transmission region of the coolant enclosure 73. Due to this, even where there is a color change in the coolant flowing through the optical device 44 due to deterioration thereof or there is a mixing of an impurity, there is no effect upon the luminous flux for utilization in forming an optical image. Therefore, in the case of a deterioration due to circulation of the coolant, optical image deterioration can be reduced or prevented.

3. Modification to the Exemplary Embodiments

The exemplary embodiments are not limited to the foregoing but include the modifications, improvements, etc. made within their scope and spirit to achieve the benefits described herein and other benefits.

Although, in the second exemplary embodiment, the partition wall 7313 formed in the first enclosure member 731 had the corrugated winding 7313A, the exemplary embodiments are not limited to these features, but may be in another shape. Namely, the first enclosure member 731 may be in a shape to increase the contact area between the coolant in the first cooling chamber 731A and the second cooling chamber 731B and the partition wall 7313. Otherwise, the structure may be free of forming such a winding or may be formed with a winding in a part.

Figure 15:
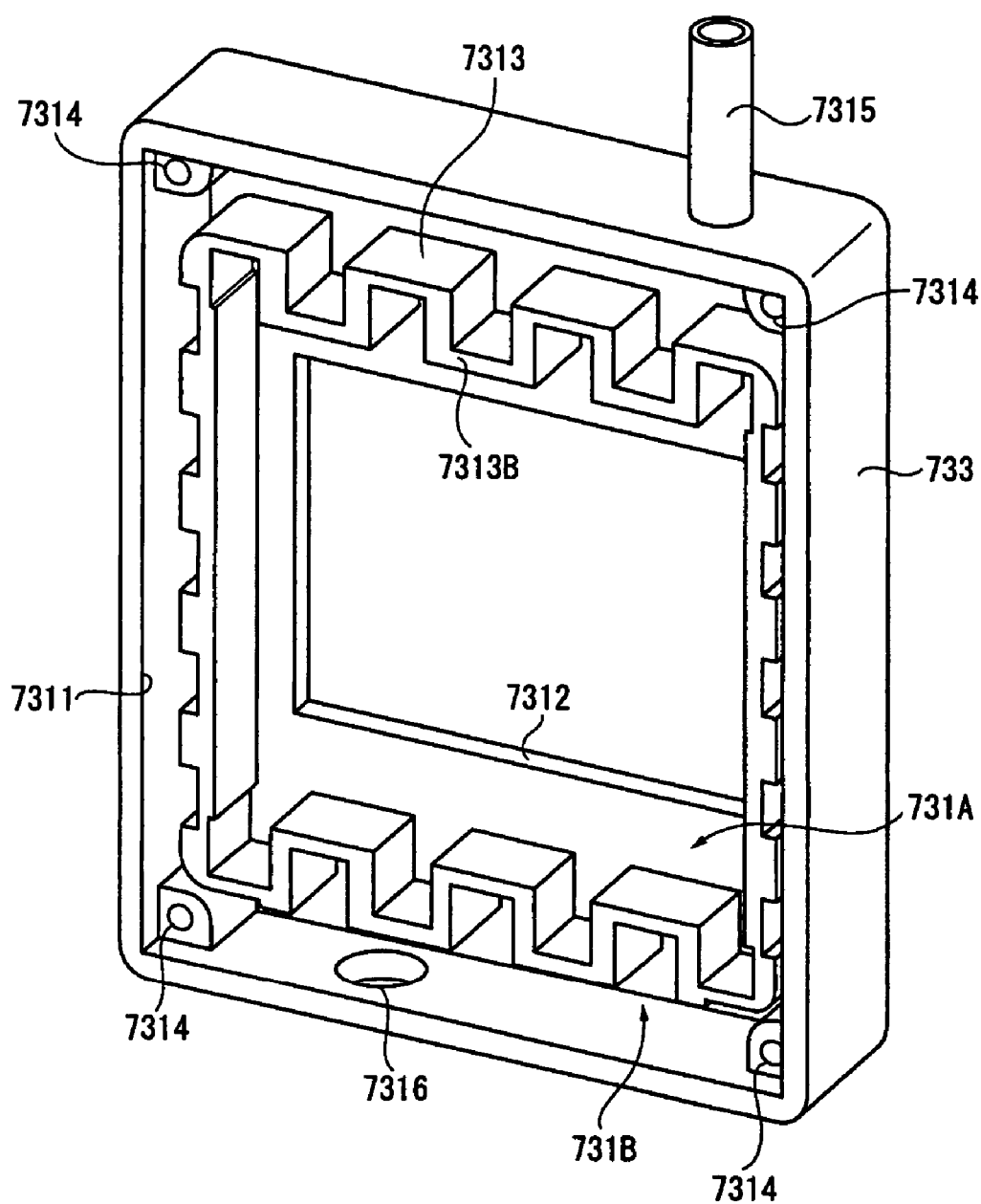
FIG. 15 illustrates a perspective schematic of a modification to the first enclosure member in an exemplary embodiment.

FIG. 15 is a perspective schematic showing a first enclosure member 733 as a modification to the first enclosure member 731.

The first enclosure member 733 constitutes a coolant enclosure 73 by combining with a second enclosure member 732, similarly to the foregoing first enclosure member 731. The first enclosure member 733 has apertures 7311, 7312, a partition wall 7313, a hole 7314, a medium passage 7315 and a medium passage port 7316, similarly to the first enclosure member 731. Meanwhile, of the spaces defined by the partition wall 7313, the inner space is structured as a first cooling chamber 731A while the outer space is as a second cooling chamber 7311B.

The partition wall 7313, formed in the first enclosure member 733, is formed with a concavo-convex winding 7313B protruding toward the first cooling chamber 731A and second cooling chamber 731B, differently from the first enclosure member 731. The winding 7313B increases the contact area, with the partition wall 7313, of the coolant hermetically sealed in the first cooling chamber 731A and coolant flowing in the second cooling chamber 7311B, similarly to the winding 7313A of the partition wall 7313 formed corrugated. Due to this, because of the increased contact area with the coolant, similarly to the winding 7313A, the efficiency of heat conduction can be improved from the coolant in the first cooling chamber 731A to the partition wall 7313. Also, the heat conducted to the partition wall 7313 can be readily cooled by the coolant flowing in the second cooling chamber 731B. Accordingly, the coolant in the first cooling chamber 731A can be efficiently cooled by the coolant flowing in the second cooling chamber 731B. Eventually, cooling is effectively made for the liquid-crystal panel 441, light incident-side polarizer 442 and light exiting-side polarizer 443.

Although the pipe 622 in the first exemplary embodiment was formed nearly in a U-form, the exemplary embodiments are not limited to this feature. The pipe may be any in form or shape provided that the pipe is structurally provided in a coolant enclosure in a manner avoiding a luminous-flux transmission region.

FIG. 16 is a front schematic showing the interior of the first enclosure member 734 as a modification to the first enclosure member 731.

The first enclosure member 734 is formed with apertures 7311, 7312. By attaching the second enclosure member 732 in a manner closing the aperture 7311, a coolant enclosure is formed to form a first cooling chamber 734A hermetically sealed with a coolant.

In the first enclosure member 734, a copper-make pipe 7341 is arranged in a coiled form in a manner surrounding the aperture 7312 by about one-and-a-half turns. The pipe 7341, at its one end, is formed with a medium inlet 7342 for allowing the coolant to flow from the external into the pipe 7341. At the other end, there is formed a medium outlet 7343 for delivering, to the external, the coolant pass the pipe 7341. The medium inlet 7342 and the medium outlet 7343 are communicated with the opening, not shown, formed in the second enclosure member 7312. Namely, the pipe 7341 at its inside is given as a second cooling chamber 734B through which the coolant is to flow.

Note that the number of turns of the pipe 7341 surrounding the aperture 7312 may be decided appropriately.

In the first enclosure member 734 thus structured, the coolant in the first cooling chamber 743A, for cooling the liquid-crystal panel 441, light incident-side polarizer 442 and light exiting-side polarizer 443, is to be cooled by the coolant flowing in the second cooling chamber 734B, i.e. in the pipe 7341. Here, because the pipe 7341 is arranged in a coiled form in a manner surrounding the aperture 7312 where the luminous flux is to transmit, the coolant passing the second cooling chamber 734B does not flow into the luminous-flux transmission region. Due to this, the coolant flowing in the second cooling chamber 734B, even if deteriorated, can be prevented from having an effect upon an optical image. Meanwhile, because the pipe 7341 forming the second cooling chamber 734B is arranged in a coiled form, the contact area can be drastically increased between the pipe 7341 and the coolant of the first cooling chamber. Accordingly, the coolant in the first cooling chamber 734A can be easily cooled by the coolant flowing in the pipe 7341, improving the cooling efficiency of the coolant of the first cooling chamber 734A and hence efficiently cooling the liquid-crystal panel 441, light incident-side polarizer 442 and light exiting-side polarizer 443.

Although, in the exemplary embodiments, the cooling devices 62, 72 having the coolant enclosures 621, 73 were respectively fixed on the light incident and exiting sides of the liquid-crystal-panel support frame 61, they may be structurally fixed on either one of the luminous-flux incident or exiting side. Note that, in case the cooling devices 62, 72 are structurally provided on the luminous-flux incident and exiting sides of the liquid-crystal-panel support frame 61, the liquid-crystal panel 441 can be cooled further effectively.

Although, in the exemplary embodiments, the coolant supply 451A2 formed at the first linkup 451A of the linkup member 451 is connected to the medium inlet 6221 and medium passage 7315 of the cooling device 62B, 72B fixedly arranged on the liquid-crystal-panel support frame 61 at its luminous-flux exiting side, it may be connected to the cooling device 62A, 72A fixedly arranged on the luminous-flux incident side. Incidentally, the liquid-crystal panel 441 at its luminous-flux exiting side is higher in the tendency of temperature increase as compared to that at the luminous-flux incident side. Furthermore, temperature tends to increase higher at the light exiting-side polarizer 443 than at the light incident-side polarizer 442. Consequently, by supplying the coolant first to the cooling device 62B, 72B provided on the luminous-flux exiting side, the coolant lower in temperature can be served in cooling the luminous-flux exiting surface of liquid-crystal panel 441 and the light exiting-side polarizer 443. Therefore, cooling can be effected further efficiently for the luminous-flux exiting surface of liquid-crystal panel 441 and the light exiting-side polarizer 443, thus stabilizing optical image formation.

Although, in the exemplary embodiments, the pipe 622, 7341 was made of a metal such as copper and aluminum, it may be structured of a flexible material such as Teflon® (registered trademark owned by E.I. DuPont de Nemours and Company). In this case, by winding the pipe structured of such a flexible material for flowing a coolant over a part of the coolant enclosure constituting a first cooling chamber, the pipe is placed in contact, for heat conduction, with the first cooling chamber so that the coolant in the first cooling chamber can be cooled by the coolant flowing in the pipe. In this case, because the coolant enclosure can be simplified in its internal structure, and further the pipe can be attached after assembling the optical device 44, the manufacture process for the optical device 44 can be simplified.

Although, in the exemplary embodiments, the cooling devices 62, 72 were fixed to the liquid-crystal-panel support frame 61 by way of fixtures 63, fixing may be by a heat-conductive adhesive or the like. Incidentally, with fixtures 63 engagable with the liquid-crystal-panel support frame 61, the cooling devices 62, 72 can be easily fixed to the liquid-crystal-panel support frame 61 as noted before.

Although, in the exemplary embodiments, the cooling devices 62, 72 are to cool the liquid-crystal panel 441 and to cool the light incident-side polarizer 442 and light exiting-side polarizer 443 held on the respective cooling devices 62, 72, there is not always a need to hold/cool the light incident-side polarizer 442 and light exiting-side polarizer 443 provided that at least the liquid-crystal panel 441 is to be cooled. Incidentally, in a case where the light incident-side polarizer 442 and light exiting-side polarizer 443 are structurally cooled simultaneously with the liquid-crystal panel 441, the light incident-side polarizer 442 and light exiting-side polarizer 443 conspicuous in temperature increase can be cooled together with the liquid-crystal panel 441 thus enabling stable optical image formation to be realized and extending the product life while suppressing or inhibiting thermal deterioration. Because there is no need to provide a cooling structure for cooling the light incident-side polarizer 442 and light exiting-side polarizer 443, the optical device 44 can be simplified in structure.

Although the exemplary embodiments explain the structure of the optical unit 4 having a generally L-shape in plan view, this is not limitative, e.g. the optical unit 4 may employ a structure having a generally U-form in plan.

Although the exemplary embodiments described in the example of the projector 1 using three liquid-crystal panels 441, the exemplary embodiments are applicable to a projector using one liquid-crystal panel only, two liquid-crystal panels only, or four or more liquid-crystal panels.

Although the exemplary embodiments use different transmission liquid-crystal panels between the light incident surface and the light exiting surface, reflective liquid-crystal panels may be used which are the same between the light incident surface and the light exiting surface. In this case, by attaching the cooling devices 62, 72 on at least one of the surfaces of the liquid-crystal panel, the foregoing effect can be exhibited.

Although the examples use the liquid-crystal panels as light modulation elements, other light modulation elements than those of liquid crystal may be used, e.g. micro-mirrors. In this case, it is possible to omit the polarizers at light incident and exiting sides.

Although the exemplary embodiment described the example of the front-type projector for projection in a direction to observe the screen, the exemplary embodiments are also applicable to a rear-type projector for projection in a direction opposite to the direction to observe the screen.

Although a preferred structure for carrying out the exemplary embodiments, etc. is disclosed in the description made so far, the exemplary embodiments are not limited thereto. Namely, although exemplary embodiments were illustrated and explained mainly as to the particular embodiments, various modification as to shape, material, quantity and other detailed structures can be added to the foregoing exemplary embodiments by a person ordinarily skilled in the art.

Therefore, the disclosed descriptions are not limited in shape, material or the like, and are mere exemplary descriptions for easily understanding the exemplary embodiments. A description in a name of a member excluding a part or the whole of the limitation in those shape, material, etc. is to be included in the exemplary embodiments.

INDUSTRIAL APPLICABILITY

The present exemplary embodiments may be utilized for a projector.

What is claimed is:

1. An optical device having a light modulation device, the optical device comprising:
a light source emitting a luminous flux;
a light modulation element to modulate the luminous flux emitted from the light source according to image information and to form an optical image;

a support frame having an aperture suited for an image-forming region of the light modulation element, the support frame holding the light modulation element;

a coolant to cool the light modulation element;

the light modulation device being formed with an aperture suited for the image-forming region of the light modulation device, at at least one of a luminous-flux incident side and luminous-flux exiting side of the light modulation device, the light modulation device having a container-like coolant enclosure that seals the coolant; and a coolant enclosure having a first cooling chamber that hermetically seals the coolant in a space including the aperture, and having a second cooling chamber formed in a position avoiding the aperture and partitioned from the first cooling chamber to allow another coolant to flow therein, the another coolant introduced from an exterior of the coolant enclosure.

2. The optical device according to claim 1, further comprising:

a tubular member structured of a heat-conductive material arranged in the first cooling chamber, the second cooling chamber being an interior space of the tubular member.

3. The optical device according to claim 2, the tubular member being arranged in a manner surrounding the aperture.

4. The optical device according to claim 1, the coolant enclosure being structured of a heat-conductive material, the coolant enclosure being formed with a partition wall surrounding the aperture, the first cooling chamber being defined at an inner of the partition wall and the second cooling chamber being defined at an outer thereof.

5. The optical device according to claim 4, further comprising:

a winding formed protruding toward inward and outward of the partition wall, in at least a part of the partition wall.

6. The optical device according to claim 1, the support frame being formed with a projection protruding outward of the coolant enclosure, a fixture being provided outer of and covering the coolant enclosure and fixing the coolant enclosure on the support frame by an engagement with the projection.

7. The optical device according to claim 1, the coolant enclosure being at both a luminous-flux exiting side and a luminous-flux incident side of the optical modulation device, to provide a flow-passage connection member communicating between the second cooling chambers of the respective coolant enclosure.

8. A projector, the projector comprising:

the optical device according to claim 1, the projector modulating a luminous flux emitted from the light source according to the image information and forming an optical image to thereby project the optical image with magnification.

9. The projector according to claim 8, further comprising:

a tubular member structured of a heat-conductive material arranged in the first cooling chamber, the second cooling chamber being an interior space of the tubular member.

10. The projector according to claim 9, the tubular member being arranged in a manner surrounding the aperture.

11. The projector according to claim 8, the coolant enclosure being structured of a heat-conductive material, the coolant enclosure being formed with a partition wall surrounding the aperture, the first cooling chamber being defined at an inner of the partition wall and the second cooling chamber being defined at an outer thereof.

12. The projector according to claim 11, further comprising:

a winding formed protruding toward inward and outward of the partition wall, in at least a part of the partition wall.

13. The projector according to claim 8, the support frame being formed with a projection protruding outward of the coolant enclosure, a fixture being provided outer of and covering the coolant enclosure and fixing the coolant enclosure on the support frame by an engagement with the projection.

14. The projector according to claim 8, the coolant enclosure being at both a luminous-flux exiting side and a luminous-flux incident side of the optical modulation device, to provide a flow-passage connection member communicating between the second cooling chambers of the respective coolant enclosure.

* * * * *